US009385537B2

(12) United States Patent
Kapcia

(10) Patent No.: US 9,385,537 B2
(45) Date of Patent: *Jul. 5, 2016

(54) USING SKIN EFFECT TO PRODUCE A MAGNETIC VECTOR POTENTIAL FOR INDUCING A VOLTAGE

(71) Applicant: Divergent, Inc., Novato, CA (US)

(72) Inventor: Jason Kapcia, Chicago, IL (US)

(73) Assignee: Divergent, Inc., Hillsboro, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/635,872

(22) Filed: Mar. 2, 2015

(65) Prior Publication Data

US 2015/0249341 A1 Sep. 3, 2015

Related U.S. Application Data

(60) Provisional application No. 61/947,334, filed on Mar. 3, 2014.

(51) Int. Cl.
*H02J 5/00* (2006.01)
*H01F 38/14* (2006.01)

(52) U.S. Cl.
CPC ............... *H02J 5/005* (2013.01); *H01F 38/14* (2013.01)

(58) Field of Classification Search
CPC .......... G01D 5/00; H02K 3/00; H02J 13/0017
USPC ........................................................ 307/104
See application file for complete search history.

(56) References Cited

U.S. PATENT DOCUMENTS

| 4,429,280 | A | 1/1984 | Gelinas |
| 4,429,288 | A | 1/1984 | Gelinas |
| 4,432,098 | A | 2/1984 | Gelinas |
| 4,447,779 | A | 5/1984 | Gelinas |
| 4,491,795 | A | 1/1985 | Gelinas |
| 4,605,897 | A | 8/1986 | Gelinas |
| 5,086,235 | A | 2/1992 | Marquet et al. |

(Continued)

FOREIGN PATENT DOCUMENTS

| EP | 0050523 A2 | 4/1982 |
| EP | 0920141 A3 | 6/1999 |

(Continued)

OTHER PUBLICATIONS

International Search Report and Written Opinion mailed Jun. 3, 2015 in PCT/US2015/018312, 30 pages.

(Continued)

*Primary Examiner* — Rexford Barnie
*Assistant Examiner* — Elim Ortiz
(74) *Attorney, Agent, or Firm* — Kilpatrick Townsend & Stockton LLP; David B. Raczkowski

(57) ABSTRACT

Apparatuses and methods are provided for driving a conductor with a signal comprising a series of pulses for inducing a voltage in an output circuit wirelessly. The pulses can be sufficiently short so as to reduce an amount of current produced along the conductor, thereby reducing the Lenz effect, which is proportional to a change in current along the conductor. Further, the pulses can have a sufficiently fast rise time (e.g., less than 30 ns) to induce a sufficiently high voltage in the output circuit (e.g., greater than 5 or 10 V). A surprisingly high voltage can be induced in an output circuit when using fast rise times of less than 30 ns.

32 Claims, 22 Drawing Sheets

(56) References Cited

U.S. PATENT DOCUMENTS

| | | | |
|---|---|---|---|
| 5,684,678 A * | 11/1997 | Barrett | H01F 21/08 363/17 |
| 5,845,220 A | 12/1998 | Puthoff | |
| 6,424,820 B1 | 7/2002 | Burdick et al. | |
| 8,024,692 B2 | 9/2011 | Suaya | |
| 8,120,207 B2 | 2/2012 | Sanders et al. | |
| 8,165,531 B2 | 4/2012 | Nikolova et al. | |
| 8,225,266 B2 | 7/2012 | Suaya | |
| 8,228,027 B2 * | 7/2012 | Gao | H02J 7/025 320/108 |
| 8,389,948 B2 | 3/2013 | Arman et al. | |
| 2002/0149890 A1 * | 10/2002 | Kaneko | H02M 7/5233 361/18 |
| 2005/0116683 A1 | 6/2005 | Cheng et al. | |
| 2006/0076338 A1 * | 4/2006 | Kagan | H05B 6/04 219/201 |
| 2007/0242026 A1 | 10/2007 | Julian et al. | |
| 2008/0087091 A1 * | 4/2008 | Shoureshi | G01N 29/223 73/602 |
| 2009/0034657 A1 * | 2/2009 | Nikolova | H01Q 1/26 375/316 |
| 2009/0243683 A1 | 10/2009 | Ochi et al. | |
| 2009/0251925 A1 * | 10/2009 | Usui | H02M 3/33561 363/16 |
| 2010/0038971 A1 | 2/2010 | Sanders et al. | |
| 2010/0277003 A1 * | 11/2010 | Von Novak | H01F 38/14 307/104 |
| 2011/0121920 A1 | 5/2011 | Kurs et al. | |
| 2011/0127846 A1 * | 6/2011 | Urano | H02J 5/005 307/104 |
| 2011/0199046 A1 | 8/2011 | Tsai et al. | |
| 2011/0225980 A1 * | 9/2011 | Cheng | F25B 21/00 62/3.1 |
| 2012/0161538 A1 * | 6/2012 | Kinoshita | H02J 17/00 307/104 |
| 2012/0299389 A1 * | 11/2012 | Lee | H04B 5/0031 307/104 |
| 2012/0306282 A1 | 12/2012 | Tan et al. | |
| 2013/0005252 A1 | 1/2013 | Lee et al. | |
| 2013/0127257 A1 * | 5/2013 | Yamamoto | H01F 38/14 307/104 |
| 2013/0214610 A1 * | 8/2013 | Tseng | H02J 7/025 307/104 |
| 2013/0241304 A1 * | 9/2013 | Bae | H04B 5/0037 307/104 |
| 2014/0159501 A1 * | 6/2014 | Kanno | H02J 17/00 307/104 |
| 2014/0268895 A1 * | 9/2014 | Keeling | B60L 11/182 363/17 |
| 2015/0001956 A1 * | 1/2015 | Saen | H04B 5/0037 307/104 |
| 2015/0249359 A1 | 9/2015 | Gunderson | |

FOREIGN PATENT DOCUMENTS

| | | | |
|---|---|---|---|
| JP | 0920141 A2 * | 6/1999 | H04B 5/0043 |
| JP | 11-331099 A | 11/1999 | |
| WO | 98/31073 A2 | 7/1998 | |

OTHER PUBLICATIONS

Office Action mailed Jun. 2, 2015 in U.S. Appl. No. 14/635,984, 7 pages.
Office Action mailed Sep. 15, 2015 in U.S. Appl. No. 14/635,971, 15 pages.
Office Action mailed Sep. 29, 2015 in U.S. Appl. No. 14/635,984, 8 pages.
Notice of Allowance issued on Feb. 1, 2016 in U.S. Appl. No. 14/635,971, filed Mar. 2, 2015. 9 pages.
Bearden, T. E., "Engineering the Active Vacuum: On the Asymmetrical Aharonov-Bohm Effect and Magnetic Vector Potential A vs. Magnetic Field B:," [online], The Tom Bearden Website, 2006, [retrieved on Mar. 4, 2015], retrieved from the Internet: <URL: www.cheniere.org>, 28 pages.
Works, George, et al., "Confirmation Measurements of Vector Potential Waves," QEX, Jul./Aug. 2012, 5 pages.
"Aharonov-Bohm Effect and Magnetic Monopoles," [online], Oct. 24, 2011 course material, [retrieved on Mar. 4, 2015], retrieved from the Internet: <URL: bolvan.ph.utexas.edu/~vadim/Classes/11f/abm.pdf>, 12 pages.
Varma, Ram, K., "Observability of the effects of curl-free magnetic vector potential on the macroscale and the nature of the 'transition amplitude wave'" PRAMANA Journal of Physics, Apr. 2010, vol. 74, No. 4, pp. 491-511.
Shukla, P. K., "Curl-free vector potential observed at the macroscale," Physica Scriptia, 2012, vol. 86, 3 pages.
U.S. Appl. No. 14/635,971 (unpublished), filed Mar. 2, 2015, entitled, "Generation and Use of Electric Fields from Capacitive Effects of a Solenoid," 47 pages.
U.S. Appl. No. 14/635,984 (unpublished), filed Mar. 2, 2015, entitled, "Wireless Power and Communication Systems Using Magnetic Vector Potential," 68 pages.

\* cited by examiner

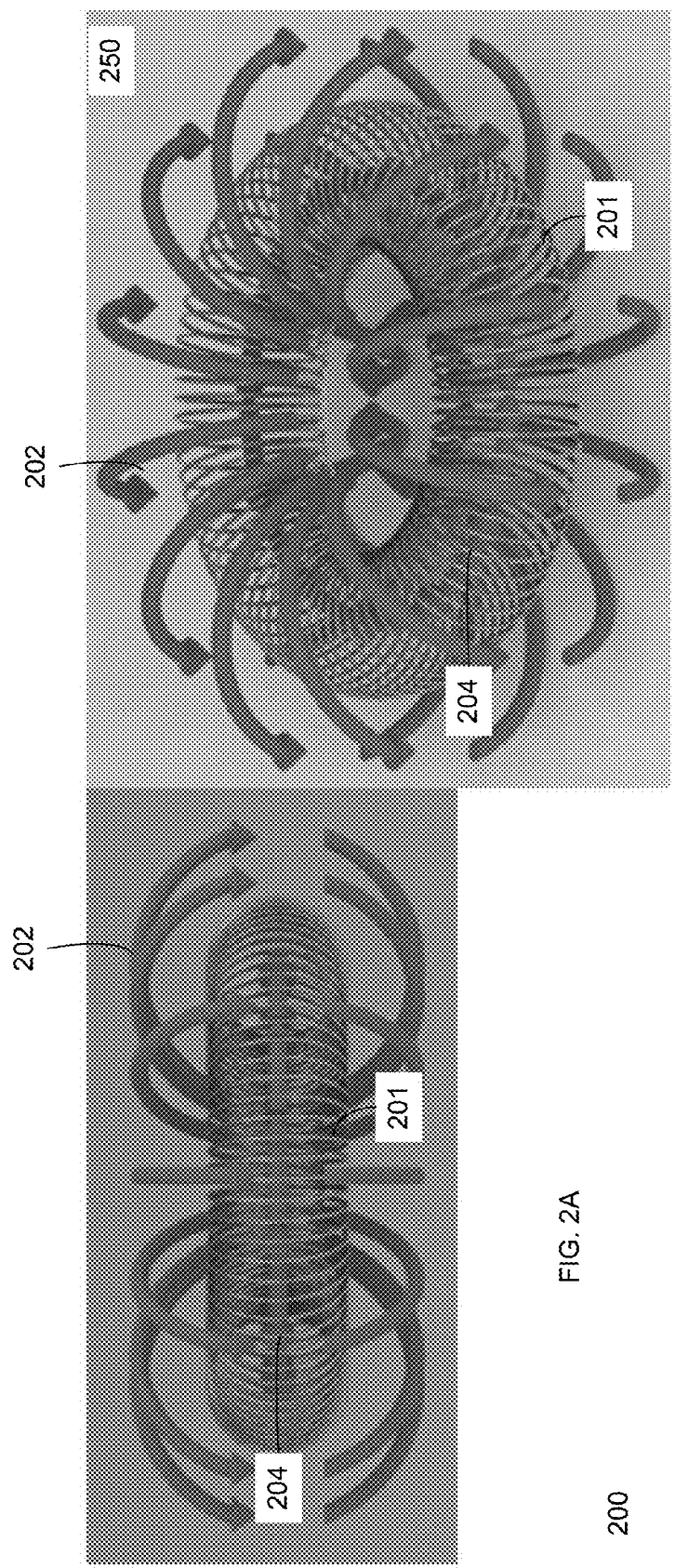

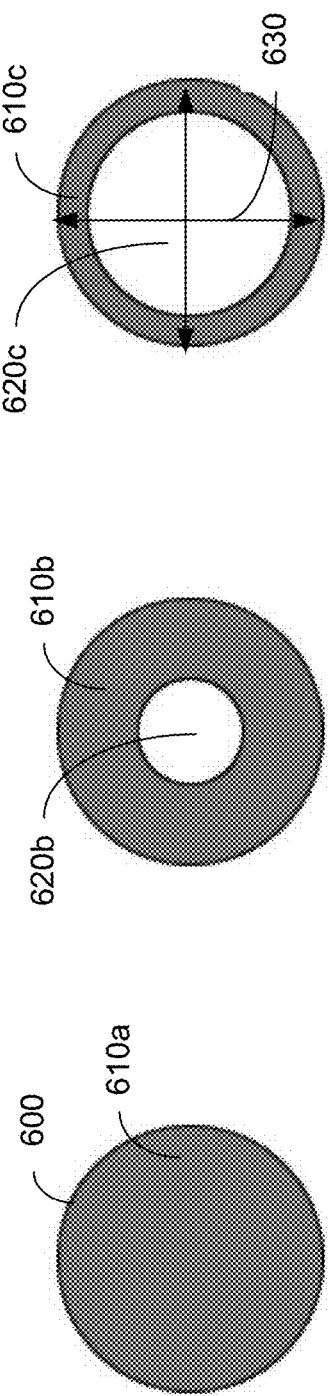

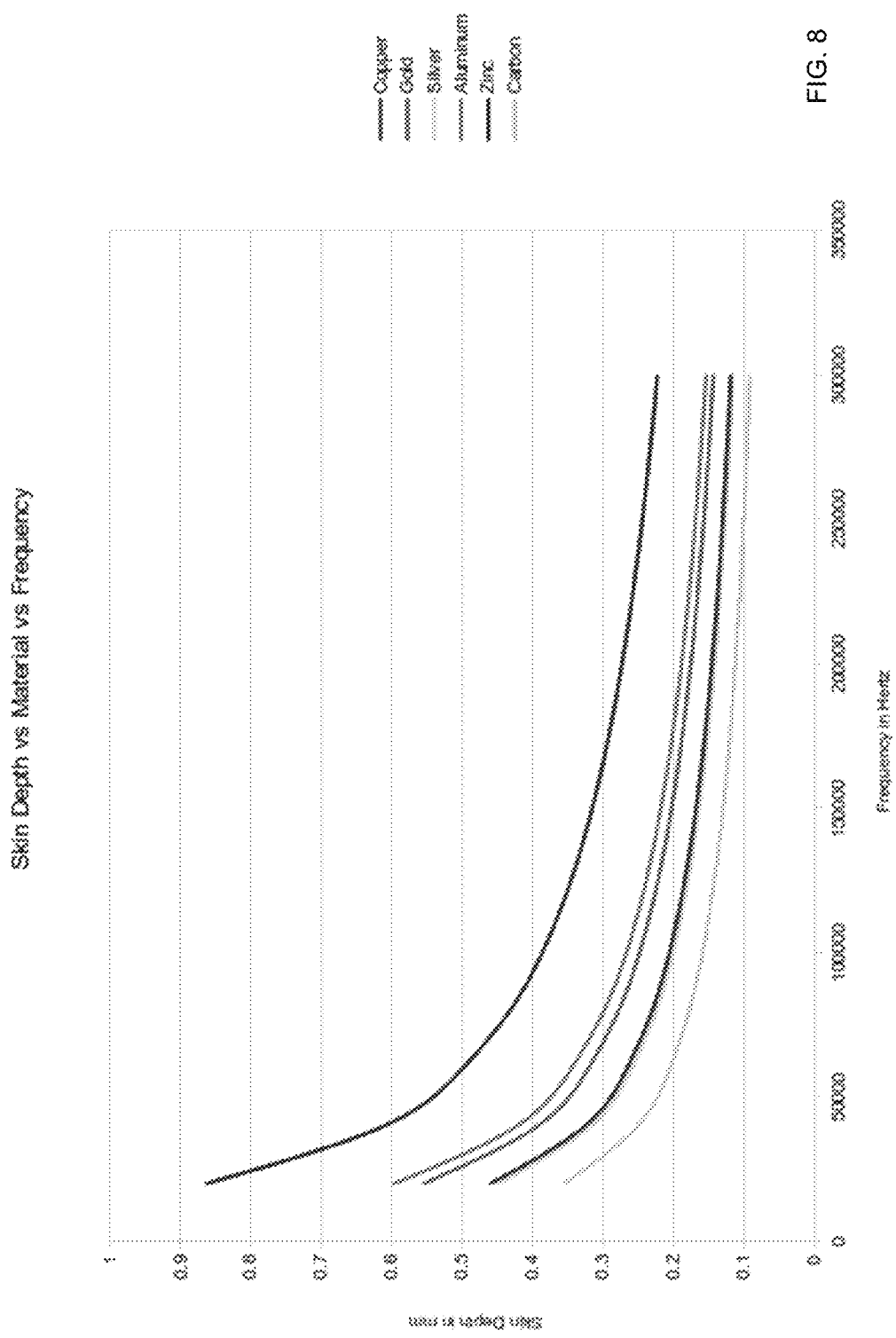

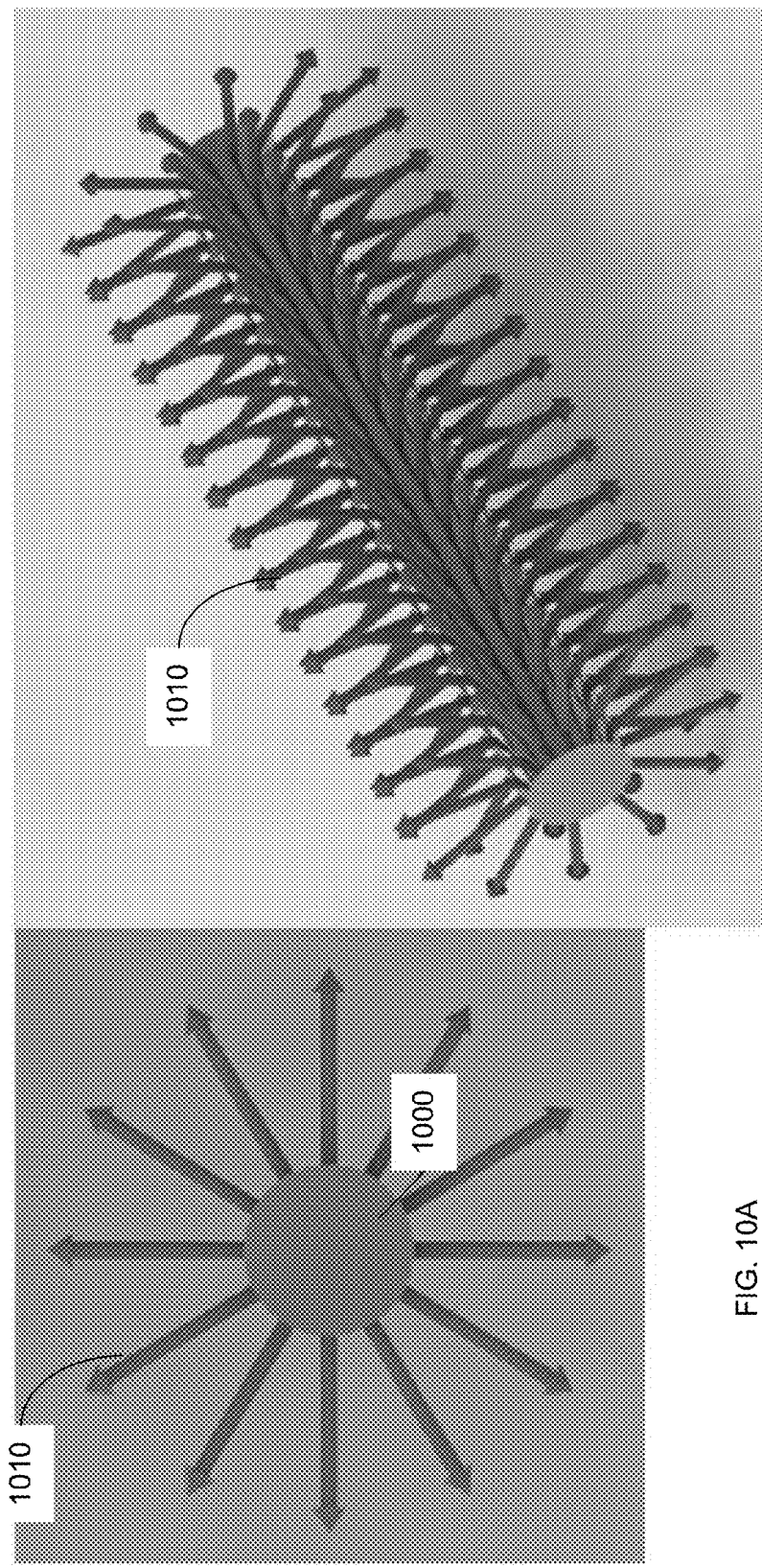

| | 1us pulse width, 50ns rise time | 750ns pulse width, 50ns rise time | 500ns pulse width, 30ns rise time | 250ns pulse width, 30ns rise time | 250ns pulse width, 21ns rise time | 150ns pulse width, 12ns rise time | 7.5ns pulse width, 3ns rise time |
|---|---|---|---|---|---|---|---|
| 1 | 0.09 | 0.01 | 0.24 | 0.11 | 2.09 | 11.51 | 8.87 |
| 75 | 0.12 | 0.11 | 0.09 | 0.26 | 10.79 | 24.97 | 23.29 |
| 150 | 0.16 | 0.28 | 0.43 | 0.27 | 20.57 | 22.79 | 24.21 |
| 225 | 0.3 | 0.37 | 0.39 | 0.3 | 27.56 | 38.15 | 29.61 |
| 300 | 0.42 | 0.36 | 0.45 | 0.47 | 32.76 | 42.67 | 47.61 |
| 375 | 0.46 | 0.47 | 0.43 | 0.51 | 39.06 | 45.92 | 54.3 |
| 450 | 0.57 | 0.5 | 0.53 | 0.72 | 48.83 | 54.86 | 70.12 |
| 525 | 0.63 | 0.6 | 0.59 | 0.76 | 54.81 | 65.21 | 132.91 |
| 600 | 0.63 | 0.65 | 0.65 | 0.74 | 62.95 | 68.23 | 181.85 |
| 675 | 0.73 | 0.69 | 0.72 | 0.63 | 137.56 | 150.62 | 325.52 |
| 750 | 0.86 | 0.85 | 1.03 | 0.86 | 227.4 | 232.08 | 477.73 |
| 825 | 0.88 | 0.97 | 0.93 | 0.98 | 415.06 | 414.84 | 538.34 |
| 900 | 0.91 | 0.97 | 1.37 | 1.36 | 1014.46 | 1066.36 | 2306.66 |
| 975 | 0.98 | 1.04 | 1.5 | 1.67 | 1084.96 | 1168.91 | 2528.18 |
| 1050 | 1.07 | 1.16 | 1.66 | 1.6 | 1182.86 | 1173.69 | 2715.01 |
| 1125 | 1.14 | 1.26 | 1.65 | 1.68 | 1251.04 | 1260.02 | 2918.77 |
| 1200 | 1.26 | 1.22 | 1.61 | 1.89 | 1347.01 | 1379.94 | 2542.8 |
| 1275 | 1.32 | 1.36 | 1.75 | 1.68 | 1416.67 | 1465.91 | 2877.51 |
| 1350 | 1.41 | 1.42 | 2.03 | 1.82 | 1512.29 | 1551.88 | 2462.85 |
| 1425 | 1.47 | 1.55 | 2.11 | 1.99 | 1583.87 | 1668.48 | 3307.78 |
| 1500 | 1.54 | 1.63 | 2.17 | 2.09 | 1617.8 | 1819.58 | 3302.45 |
| 1575 | 1.61 | 1.7 | 2.28 | 2.16 | 1783.02 | 2243.11 | 3547.85 |
| 1650 | 1.67 | 1.79 | 2.05 | 2.1 | 1989.73 | 2049.5 | 3231.5 |
| 1725 | 1.75 | 1.81 | 2.28 | 2.2 | 2075.74 | 2283.42 | 3608.82 |
| 1800 | 1.9 | 1.91 | 2.32 | 2.49 | 2064.27 | 1996.45 | 3079.03 |
| 1875 | 1.94 | 1.94 | 2.3 | 2.49 | 2178.19 | 2357.31 | 3649.74 |
| 1950 | 2 | 1.96 | 2.66 | 2.52 | 2215.26 | 2563.1 | 4101.68 |
| 2025 | 2.1 | 2.05 | 2.64 | 2.65 | 2295.25 | 2677.46 | 3583.76 |
| 2100 | 2.18 | 2.22 | 2.76 | 2.79 | 2454.16 | 2345.21 | 4139.57 |
| 2175 | 2.21 | 2.29 | 2.63 | 2.81 | 2586.79 | 2505.74 | 4248.25 |
| 2250 | 2.32 | 2.34 | 2.84 | 2.73 | 2705.66 | 2852.44 | 3645.18 |
| 2325 | 2.33 | 2.36 | 2.87 | 2.88 | 2632.96 | 2781.42 | 4422.9 |
| 2400 | 2.47 | 2.53 | 2.78 | 3.03 | 2695.31 | 2808.73 | 4432.21 |
| 2475 | 2.52 | 2.5 | 3.03 | 3.07 | 2830.73 | 2869.22 | 4370.52 |
| 2550 | 2.65 | 2.6 | 3.05 | 3.14 | 2946.17 | 3205.39 | 4812.43 |
| 2625 | 2.7 | 2.63 | 3.04 | 3.12 | 3049.88 | 3174.69 | 4469.79 |
| 2700 | 2.79 | 2.7 | 3.18 | 3.3 | 3155.98 | 3087.25 | 4697.86 |
| 2775 | 2.81 | 2.87 | 3.24 | 3.17 | 3254.45 | 3163.16 | 5548.99 |
| 2850 | 2.94 | 3 | 3.5 | 3.33 | 3201.29 | 3639.12 | 5009.03 |
| 2925 | 3.03 | 3 | 3.38 | 3.46 | 3452.94 | 3569.87 | 5357.63 |
| 3000 | 3.05 | 3.03 | 3.36 | 3.67 | 3515.15 | 3578.01 | 5449.36 |
| 3075 | 3.08 | 3.12 | 3.5 | 3.79 | 3615.43 | 3704.31 | 5622.91 |
| 3150 | 3.18 | 3.16 | 3.64 | 3.82 | 3593.13 | 3632.18 | 5279.82 |
| 3225 | 3.25 | 3.27 | 3.78 | 3.67 | 3609.86 | 3943.25 | 5591.45 |
| 3300 | 3.34 | 3.34 | 3.65 | 3.97 | 3745.06 | 3991.26 | 4831.74 |
| 3375 | 3.45 | 3.44 | 3.79 | 3.99 | 3816.48 | 4211.4 | 5616.56 |
| 3450 | 3.47 | 3.5 | 4.13 | 4.15 | 3938.2 | 4230.31 | 5891.81 |
| 3525 | 3.6 | 3.61 | 4.23 | 4.18 | 4097.17 | 3662.65 | 5677.09 |
| 3600 | 3.7 | 3.63 | 4.21 | 4.11 | 4127.52 | 4213.48 | 5914 |
| 3675 | 3.79 | 3.78 | 4.07 | 4.38 | 4109.5 | 4521.88 | 6238.28 |
| 3750 | 3.76 | 3.8 | 4.24 | 4.47 | 4167.48 | 4361.59 | 6510.66 |

USING SKIN EFFECT TO PRODUCE A MAGNETIC VECTOR POTENTIAL FOR INDUCING A VOLTAGE

CROSS-REFERENCES TO RELATED APPLICATIONS

The present application claims priority from and is a nonprovisional application of U.S. Provisional Application No. 61/947,334, entitled "Using Skin Effect To Produce A Magnetic Vector Potential" filed Mar. 3, 2014, the entire contents of which are herein incorporated by reference for all purposes.

This application is also related to commonly owned U.S. Provisional Patent Application Nos. 61/947,342 and 61/947,343, the disclosures of which are incorporated by reference in its entirety. This application is also related to commonly owned and concurrently filed U.S. Nonprovisional Patent Applications entitled "Generation And Use Of Electric Fields From Capacitive Effects Of A Solenoid" by Kapcia; and U.S. Patent Application entitled "Wireless Power And Communication Systems Using Magnetic Vector Potential" by Kapcia, the disclosures of which are incorporated by reference in its entirety.

BACKGROUND

In electronic circuits and in the transmission of electricity, current flows down the wire. This current creates a magnetic field. When alternating current (AC) is used, the magnetic field is time-varying, which creates an electric field that opposes a change in the current as an electromotive force (emf). This is referred to as Lenz's law.

When the electric field is used to induce a current in a second coil, this opposing electric field causes more power to be used to change the current in the first coil, than if the opposing electric field did not exist. The opposing electric field effectively increases the resistance of the wire, thereby requiring more power to overcome the opposing electric field. Accordingly, typical inductive techniques are adversely affected by Lenz's law.

Therefore, it is desirable to provide improved systems, apparatuses, and methods for inducing a motion of electrons in a second circuit based on the operation of a first circuit.

BRIEF SUMMARY

Embodiments provide apparatuses and methods for driving an input conductor with a signal comprising a series of voltage pulses for inducing a voltage in an output circuit wirelessly. The pulses can be sufficiently short so as to reduce an amount of current produced along the input conductor, thereby reducing the Lenz effect, which is proportional to a change in current along the input conductor. Further, the pulses can have a sufficiently fast rise time (e.g., less than 30 ns) to induce a sufficiently high voltage in the output circuit (e.g., greater than 5 or 10 V). A surprisingly high voltage can be induced in an output circuit when using fast rise times of less than 30 ns.

Such pulses can take advantage of the skin effect, which is normally considered a hindrance. For example, embodiments can use the skin effect in an input conductor of a first (input) circuit to produce a time-varying magnetic vector potential that projects radially from a surface of the input conductor. The time-varying magnetic vector potential can provide an electric field for inducing a motion of electrons in a second (output) circuit. Voltage pulses having a rapid change to a maximum voltage can be used to increase the skin effect, while reducing any opposing emf as the amount of current is reduced due to a short duration of the pulse.

During the rapid increase in voltage of a pulse, the skin effect can cause electrons to move towards a surface of the input conductor, thereby causing a magnetic vector potential in a direction perpendicular to the surface. The voltage pulses can be of sufficiently short duration that an appreciable current along the wire does not occur, and thus a time-varying magnetic field and the opposing emf do not result to an appreciable degree.

A better understanding of the nature and advantages of embodiments of the present invention may be gained with reference to the following detailed description and the accompanying drawings.

BRIEF DESCRIPTION OF THE DRAWINGS

FIG. 2A shows a toroidal coil 201 according to a conventional design. FIG. 2B shows a diagram 250 of a perspective view of toroidal coil 201.

FIGS. 6A-6C provide cross-sectional views of a conductive wire 600 carrying different types of currents to illustrate the skin effect according to embodiments of the present invention.

FIG. 8 shows a plot of skin depth vs. frequency for copper, gold, silver, aluminum, zinc, and carbon.

FIG. 10A shows a cross-sectional view of a wire 1000 with a radial magnetic vector potential 1010 produced from voltage pulses according to embodiments of the present invention. FIG. 10B shows a perspective view of wire 1000 and the radial magnetic vector potential 1010 having a nonzero divergence according to embodiments of the present invention.

FIG. 17 shows a table 1700 of the data points used to create plots of FIGS. 16A and 16B according to embodiments of the present invention.

TERMS

Figures 1A, 1B:
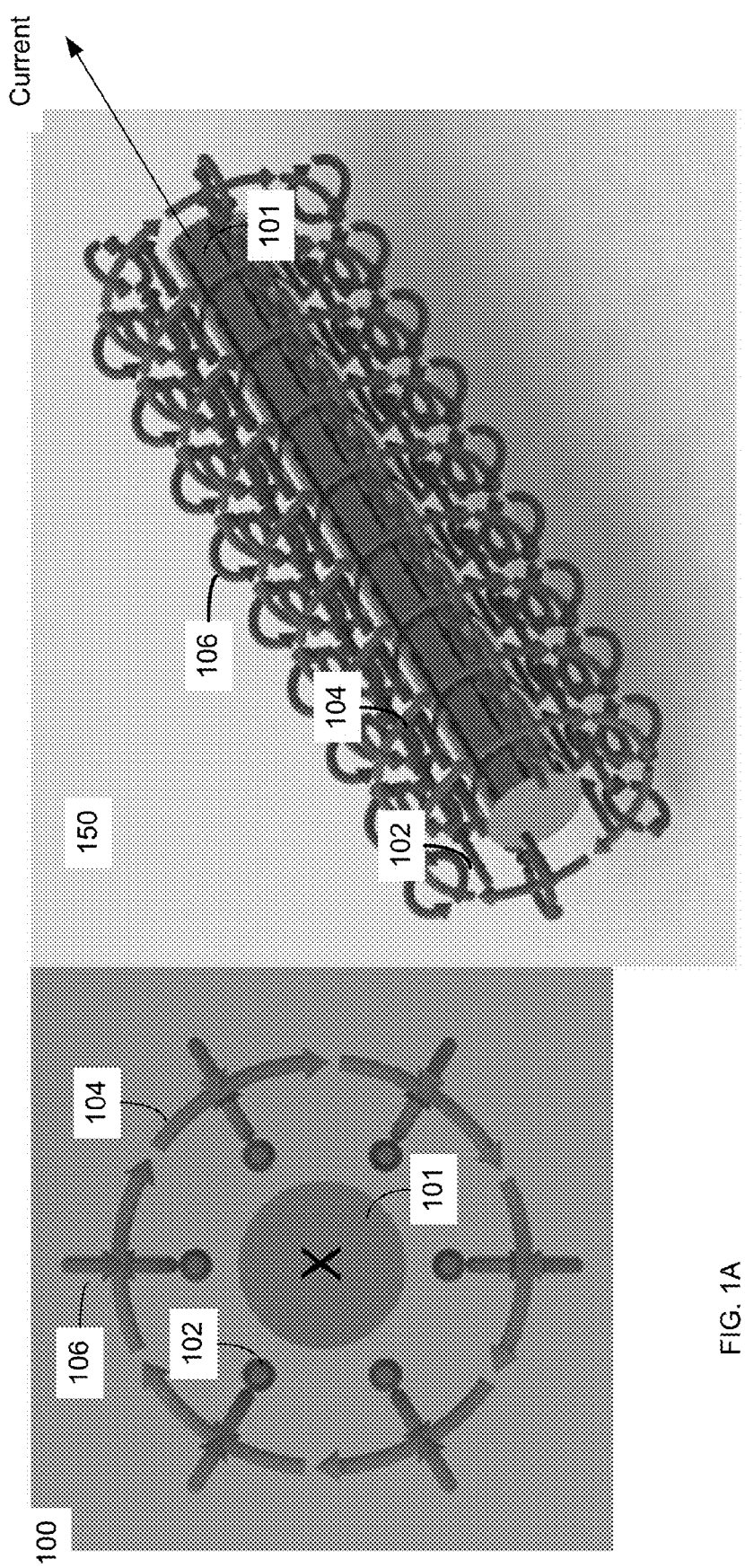
FIG. 1A shows a diagram 100 illustrating the magnetic vector potential and magnetic fields resulting from current in a wire 101.
FIG. 1B shows a diagram 150 of a perspective view of wire 101.

As used herein, a "pulse" is different than a portion of a periodic, continuous signal. A pulse may have a beginning and ending that does not explicitly depend on other pulses, where as an AC waveform has a specific property throughout the waveform. A pulse would generally be positive or negative. After a pulse, the voltage decays back toward a steady-state value, e.g., toward ground. Thus, an alternating signal (e.g., sinusoidal wave) is not composed of pulses.

A "rise time" of a pulse is an amount of time for a pulse to increase from a first specified value to a second specified value. The first specified value being 10% or less of the amplitude, and the second specified value is 90% or more of the amplitude. The "amplitude" of a pulse is a maximum voltage achieved by a pulse. A "width" of a pulse corresponds to a time between a leading edge and a falling edge of a pulse. The width can be measured as the width at half of the amplitude, typically referred to as full width at half maximum (FWHM). In other examples, a width of ground to ground could be used.

A "conductor" refers to materials that conduct ions, e.g., electrons. Examples of conductors are metals, certain ceramic materials, conductive polymers, and certain carbon structures.

DETAILED DESCRIPTION

This disclosure describes how, in accordance with Maxwell's Equations, the skin effect can be used to move electrons from a middle of a conductor toward a surface, thereby creating a divergence in a magnetic vector potential $\vec{A}$, which in turn can produce an electric field without producing an accompanying magnetic field (i.e., $\nabla \times \vec{A} = 0$ or is substantially zero). In doing so, the Lenz effect can be reduced or eliminated.

For example, using very short pulses along a wire with sufficiently fast rise times (e.g., less than 30 ns), the motion of electrons can be predominantly directed radially as opposed to along the wire, as would normally occur. This reduction in current along the wire can reduce or eliminate the Lenz effect. The fast rise times can ensure that a change in the magnetic vector potential $\vec{A}$ is sufficiently high to create a sufficiently high electric field for inducing a voltage in an output circuit. And, the fast rise times coupled with small widths (e.g., 100, 10, or 1 microseconds or smaller) for the pulses can ensure that an appreciable amount of current does not begin to flow, thereby limiting the Lenz effect. Ideally, the width can be about the same as the rise time.

When a loaded output coil is placed in the electric field produced by the diverging magnetic vector potential $\vec{A}$, current can flow in a loaded coil. The magnetic field produced by the current in the loaded output coil may be configured to not couple back to any substantial magnetic field of the input coil by the geometrical configuration of the two coils with respect to each other. For example, the loaded output coil can have an orientation such that the magnetic field produced by the current in the loaded coil will be perpendicular to an orientation of the input coil, thereby avoiding unwanted effects, such as inducing an appreciable amount of current along the input coil.

I. Electrodynamics

In order to understand how to produce and optimize the divergence of the magnetic vector potential $\vec{A}$, we will begin by describing the base Maxwell equations for electromagnetic potentials: $\nabla V$ (electric potential) and $$\frac{\partial \vec{A}}{\partial t}$$

(time derivative of the magnetic vector potential $\vec{A}$), both of which can result in an electric field.

A. Magnetic Vector Potential

Both the Aharonov-Bohm effect and Josephson junctions, in addition to a number of other quantum mechanical phenomena, demonstrate that electromagnetic potentials (specifically the magnetic vector potential $\vec{A}$) form the physical basis from which electric and magnetic fields emerge. For example, the magnetic field $\vec{B}$ is defined in term of the magnetic vector potential $\vec{A}$, namely the magnetic field $\vec{B}$ equals the curl ($\nabla \times$) of the magnetic vector potential $\vec{A}$:

$$\vec{B} = \nabla \times \vec{A}.$$

The electric field can also be generated from the magnetic vector potential $\vec{A}$, as well as the electric potential $\nabla V$ (also referred to as a voltage). The electric field equals the gradient of a voltage added to the partial derivative of the magnetic vector potential $\vec{A}$ with respect to time:

$$\vec{E} = -\nabla V - \frac{\partial \vec{A}}{\partial t}.$$

The negative signs denote direction.

Because $\nabla V$ and $$\frac{\partial \vec{A}}{\partial t}$$

are effectively added to equal the electric field $\vec{E}$, this means $\nabla V$ and $$\frac{\partial \vec{A}}{\partial t}$$

have equivalent units as shown by:

$$\vec{A} = \frac{V \cdot s}{m}, \text{ so } \frac{\partial \vec{A}}{\partial t} = \frac{V}{m},$$

where V is voltage, s is seconds, and m is meters. Thus, the magnetic vector potential $\vec{A}$ equals a voltage times seconds divided by meters, and the partial derivative with respect to time equals a voltage divided by meters. And, the gradient of a voltage equals a voltage divided by meters:

$$\nabla V = \frac{v}{m}.$$

By looking at the two terms in their SI units above, it can be seen that $\nabla V$ and $$\frac{\partial \vec{A}}{\partial t}$$

are equivalent and depending on the circumstance, the terms $\nabla V$ and $$\frac{\partial \vec{A}}{\partial t}$$

can be used to calculate the electric field $\vec{E}$.

B. Maxwell's Equations

Maxwell equations can be written utilizing the magnetic vector potential $\vec{A}$ as follows:

$$\vec{B} = \nabla \times \vec{A},$$

$$\vec{E} = -\frac{\partial \vec{A}}{\partial t}.$$

The electric field equals the negative change of the magnetic vector potential $\vec{A}$ over time. The negative sign signifies that the electric field $\vec{E}$ is in the physical direction opposite to the direction of the changing magnetic vector potential $\vec{A}$.

As can be seen in the above two equations, both the magnetic field $\vec{B}$ and electric field $\vec{E}$ are defined by a modulation or alteration of the magnetic vector potential $\vec{A}$, which demonstrates that $\vec{A}$ serves as the physical basis for both magnetic and electric fields, a fundamental axiom of electrodynamics theory. Because a magnetic field is made from the curl of the magnetic vector potential $\vec{A}$, there is a time-varying magnetic field when there is a time-varying curl of the magnetic vector potential $\vec{A}$. And, when there is a time-varying magnetic vector potential $\vec{A}$, there is an electric field in that same region of space, but there is no requirement that $\vec{A}$ has a non-zero curl.

The equations above can be used to show further relationships between $\vec{B}$ and $\vec{E}$ that might occur:

$$-\frac{\partial \vec{B}}{\partial t} = -\frac{\partial (\nabla \times \vec{A})}{\partial t} = -\nabla \times \frac{\partial \vec{A}}{\partial t} = \nabla \times \vec{E}.$$

Thus, a magnetic field $\vec{B}$ that is changing through time equals the curl of the magnetic vector potential $\vec{A}$ that is changing over time, which in turns then equals the curl of the electric field $\vec{E}$. Accordingly, a time-varying magnetic field can create a new electric field that has a curl. Since a time-varying $\vec{B}$ is akin to a time-varying curled $\vec{A}$, which produces the magnetic field $\vec{B}$ in the first place, a curled electric field $\vec{E}$ is produced in the region about a straight magnetic field $\vec{B}$ when and only when that magnetic field $\vec{B}$ is changing through time (i.e. is time-varying).

C. Magnetic Field from Current in Wire

FIG. 1A shows a block diagram 100 illustrating the magnetic vector potential and magnetic fields resulting from current in a wire 101. Block diagram 100 shows a conventional system where the magnetic vector potential $\vec{A}$ around the wire is in the form of a gradient down the length of the wire with ensuing curl and voracity of the magnetic vector potential $\vec{A}$ which causes magnetic fields to be created about the wire.

The current in wire 101 is shown going into the diagram. The magnetic vector potential 102 is in the same direction as the current, and is shown outside wire 101. The magnetic vector potential 102 decreases with radial distance away from wire 101, which causes a non-zero curl in magnetic vector potential 102. A magnetic field 104 results from $\vec{B} = \nabla \times \vec{A}$. The circular shape of the magnetic field follows from the radial decay of magnetic vector potential 102.

Now, if the current is increasing over time, then the increase in magnetic field 104 is also clockwise, and a changing electric field is produced. The changing electric field corresponds to time-varying magnetic vector potential 106, which is in the opposite direction of the electric field.

FIG. 1B shows a diagram 150 of a perspective view of wire 101. One can see the lines of magnetic vector potential 102 moving with current, and the resulting magnetic field 104. The magnetic vector potential 106 corresponding to the electric field that is generated as a result of the time-varying magnetic field 104 is also shown.

D. Magnetic Field from Current in Toroidal Coil

FIG. 2A shows a toroidal coil 201 according to a conventional design. Magnetic vector potential 202 corresponds to a direction of current in toroidal coil 201, also called a toroidal solenoid. A power supply is not shown, for ease of illustration. A magnetic field 204 results through the core of the coils (which is air in the graphic but is usually ferromagnetic). Toroids are used here because the magnetic field in a toroidal coil is contained within the core. FIG. 2B shows a diagram 250 of a perspective view of toroidal coil 201.

In FIGS. 2A and 2B, if one were to wind a secondary coil around toroidal coil 201 such that the secondary coil was larger than toroidal coil 201 (i.e., toroidal coil 201 is inside the secondary coil), and an AC signal as fed into toroidal coil 201, there would be a changing magnetic vector potential $\vec{A}$, and hence a changing electric field in the same orientation (but opposite direction) as the arrows of magnetic vector potential 202. Since the magnetic field is contained in the core, and the changing magnetic vector potential $\vec{A}$ is not, it is clear to see why an emf can be induced in the secondary coil.

The magnetic vector potential $\vec{A}$ in and around the coil in the conventional geometry is in the form of a gradient down the length of the wire with ensuing curl and vorticity of the magnetic vector potential $\vec{A}$ giving rise to the magnetic fields that are seen in the area of the core of the coil.

E. Lenz's Law

As described above, under normal operation, a changing current encounters an emf in the opposite direction. Thus, to continue changing the current, additional power is required.

FIGS. 3A-3D show Lenz's law for one current loop being driven by alternating current (AC). Each figure shows the direction of the current I, the direction of the magnetic field B, the direction of change $\dot{B}$ of the magnetic field, and the direction of the induced current $I_{ind}$ that results.

Figure 3A:
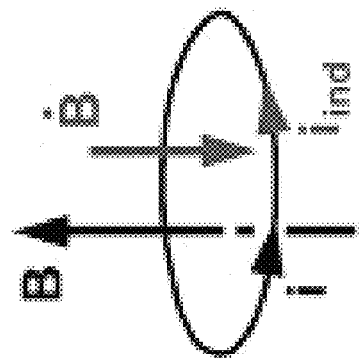
FIGS. 3A-3D show Lenz's law for one current loop being driven by AC.

In FIG. 3A, the current is flowing in a counter-clockwise direction, which results in a magnetic field up. The current is increasing in the counter-clockwise direction as signified by $\dot{B}$ pointing up. Using $$-\frac{\partial \vec{B}}{\partial t} = \nabla \times \vec{E},$$

the resulting emf is in the clockwise direction due to the negative sign. Thus, the induced current $I_{ind}$ is in the opposed direction as I, and more power must be used to overcome the induced current $I_{ind}$ to continue increasing I.

Figure 3B:
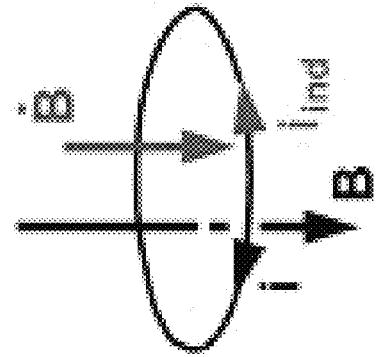
Figure 3D:
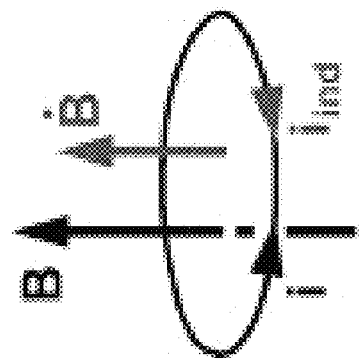
Figure 3C:
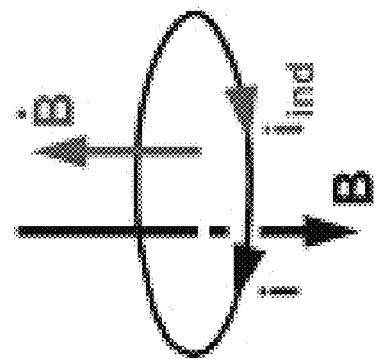

In FIG. 3B, the current I is still in the counter-clockwise direction, but the current I is decreasing, which results in the change $\dot{B}$ of the magnetic field being down. The induced current $I_{ind}$ attempts to maintain the current at the previous value, and thus is in the same direction. Accordingly, the emf is opposing the change in the current. FIGS. 3C and 3D show a similar result when the current I is clockwise.

Having covered the interrelationships between electric and magnetic fields and the magnetic vector potential $\vec{A}$, we will briefly describe the operation of transformers and motors based on the equations above. As a result of the interaction of two wire (coil) geometries, transformers, generators, and motors inherently couple, causing a Lenz reaction.

Due to the geometry of the coils described in the equations below, the inherent design of transformers, generators and motors is self-limiting. A change in current produces a time-varying magnetic field, which creates an electric field that opposes the change in the current. This phenomena is called Lenz law, and can also be characterized as: When an emf is generated by a change in magnetic flux of a circuit according to Faraday's Law, the polarity of the induced emf is such that it produces a current whose magnetic field opposes the change in the original magnetic field which produces it. This back-coupling, self-limiting behavior, as described by Lenz's law, is as follows.

FIGS. 4A-4D show block diagrams of four potential standard (coiled) wire interactions demonstrating the back-coupling, self-limiting behavior described in Lenz's law. All coil axes are in alignment. The four standard coil interactions represent Faraday's and Lenz's laws and demonstrate how the movement of one coil (the 'input'), with a magnetic field in and around it, induces a magnetic and electric field upon another coil (the 'output') that couple to, and are in direct opposition to the electric and magnetic fields (and movement) of the input coil.

Figure 4C:
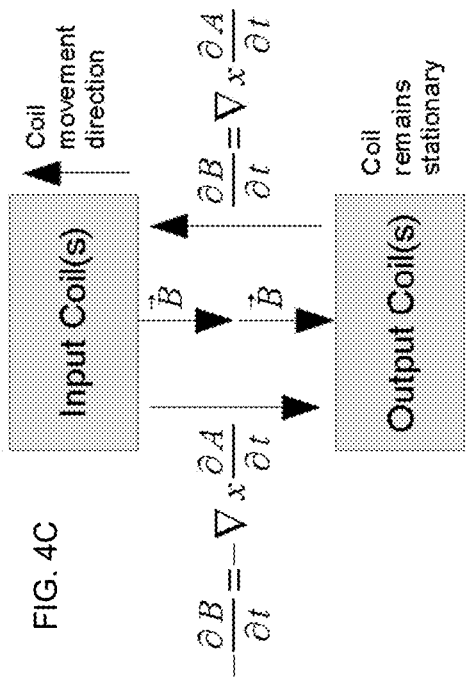
FIGS. 4A-4D show block diagrams of four potential standard (coiled) wire interactions demonstrating the back-coupling, self-limiting behavior described in Lenz's law.
Figure 4D:
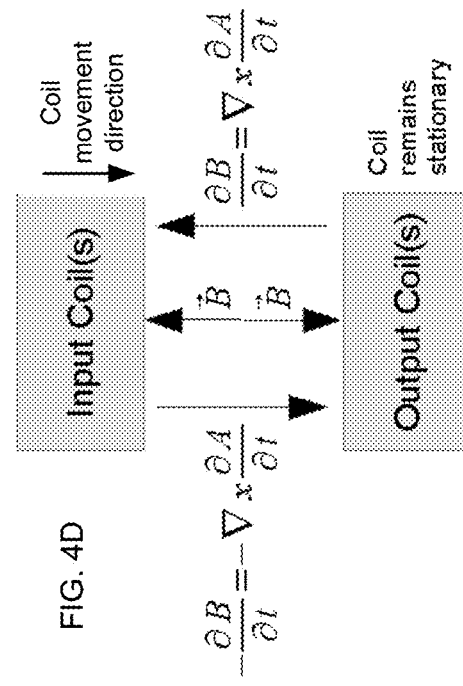
Figure 4A:
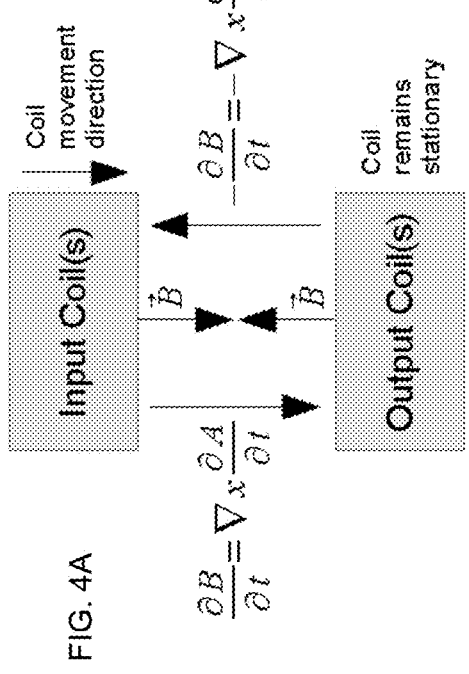

In FIG. 4A, the input coil is moved toward the output coil. The input coil has a current that creates a first $\vec{B}$ field in the down direction. If the input coil is moved down (or the current increases), the magnetic flux in the output coil increases, thereby resulting in an electric field that causes an opposite current in the output coil, and thereby causing a second $\vec{B}$ field in the up direction. This effect is shown in the equation:

$$\frac{\partial \vec{B}}{\partial t} = \nabla \times \frac{\partial \vec{A}}{\partial t} = -\nabla \times \vec{E},$$

where the negative sign shows the $\vec{E}$ in the opposite direction. The second $\vec{B}$ field will be changing thereby causing an emf in the same direction of the original current, as shown with $$-\frac{\partial \vec{B}}{\partial t} = -\nabla \times \frac{\partial \vec{A}}{\partial t} = \nabla \times \vec{E}.$$

This induced emf in the input coil requires more power from the power supply for the input coil. The result is a continuous need to draw input energy/power from a source to facilitate the desired, and perceived power transfer occurring between the source and load.

Also, the magnetic fields in the opposite directions attempt to repel the input and output coil to keep them at the same distance. For example, when the input coil moves toward the output coil, the two magnetic fields increase in opposite direction and the two coils repel each other. Similarly, if the current in the input coil is increased, the two magnetic fields will increase, thereby causing the two coils to repel each other.

Figure 4B:
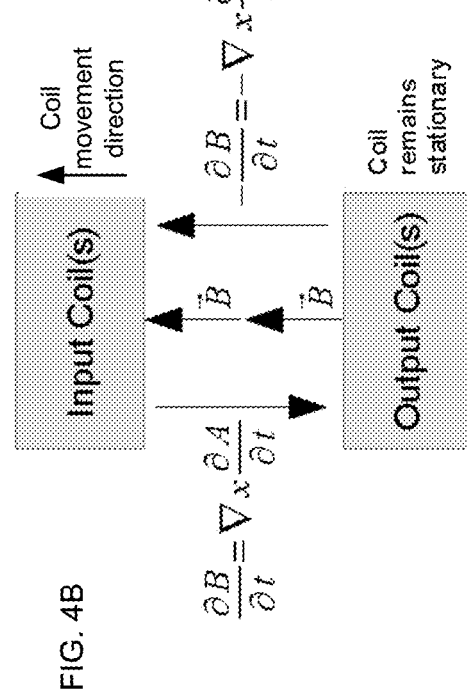

In FIG. 4B, the input coil is moved away from the output coil. The input coil has a current (e.g., counterclockwise) that creates a first $\vec{B}$ field in the up direction. When the input coil is moved up (or the current decreases), the magnetic flux in the output coil decreases (shown by flux being down). An induced electric field causes a counter-clockwise current in the output coil, thereby causing a second $\vec{B}$ field in the up direction. The two magnetic fields in the same direction attract each other, thereby creating an attractive force that attempts to keep the coils at the same distance. If the current in the input coil decreased, the induced second $\vec{B}$ field will cause an attraction between the coils.

In FIG. 4C, the input coil is moved away from the output coil. The input coil has a current (e.g., clockwise) that creates a first $\vec{B}$ field in the down direction. When the input coil is moved up (or the current decreases), the magnetic flux in the output coil decreases. An electric field causes a clockwise current in the output coil, thereby causing a second $\vec{B}$ field in the down direction. The two magnetic fields in the same direction attract each other, thereby creating an attractive force that attempts to keep the coils at the same distance. If the current in the input coil decreased, the induced second $\vec{B}$ field will cause an attraction between the coils.

In FIG. 4D, the input coil is moved toward the output coil. The input coil has a current (e.g., counterclockwise) that creates a first $\vec{B}$ field in the up direction. When the input coil is moved down (or the current increases), the magnetic flux in the output coil increases. A resulting electric field causes a clockwise current in the output coil, thereby causing a second $\vec{B}$ field in the down direction. The two magnetic fields in the opposite direction repel each other, thereby creating a repelling force that attempts to keep the coils at the same distance. If the current in the input coil is increased, the induced second $\vec{B}$ field will cause a repelling between the coils.

As can be seen by these various scenarios, the change in current in the input coil affects an output coil, whose changing behavior affects the input coil. This interaction between the coils can adversely affect the operation of both coils and require energy or force to keep coils stationary.

The most common application in which coils are in motion relative to one another is in the design and operation of motors and generators. Yet, coils do not need to be in motion for back-coupling, or for the Lenz's reaction to occur, as evidenced by solid state transformers. In this case, two coils are wound upon a common core such that the magnetic field $\vec{B}$ changing through time stimulates the movement of one coil in relation to another. The AC provides a changing magnet field $\vec{B}$ in the input coil (primary of the transformer), which induces an emf upon the output coil (secondary of the transformer).

The geometry employed in conventional electrical systems creates a coupled relationship between electric and magnetic fields (and input and output coils), causing the self-limiting, input energy dependent behavior described above and by Lenz' law. While the Lenz's reaction is believed to be inherent to electromagnetic interactions, it is nothing more than the reflection of coupled magnetic fields being produced by the geometry of the wires and coils.

In the following section, the same Maxwell potential equations listed above are used to explain how the magnetic vector potential $\vec{A}$ (MVPA) can be used to produce the skin effect, which in turn produces an electric field without producing an accompanying magnetic field. In doing so, the Lenz reaction is reduced or eliminated.

II. Divergence

As described above, in conventional system designs, conductors are used to conduct currents down the length of a wire, thereby producing a radial gradient in $\vec{A}$ that is perpendicular to the direction of $\vec{A}$ along the wire (i.e., $\vec{A}$ decreases radially from the wire and $\vec{A}$ is along the wire). This gradient in $\vec{A}$ provides an ensuing curl of the magnetic vector potential $\vec{A}$ (i.e., non-zero curl). As mentioned above, this curl leads to a magnetic field, which when time-varying causes a limiting effect in the conductor. If the curl can be reduced or eliminated, the limiting effect can be reduced, and the energy imparted into a first coil to wirelessly produce a motion of electrons in a second coil (not receiving electrons from the first coil) can be reduced.

To reduce or eliminate the non-zero curl in $\vec{A}$, embodiments can create a divergence in $\vec{A}$, e.g., in short bursts by using voltage pulses. The magnetic vector potential $\vec{A}$ is a continuously differentiable vector field in three dimensions with $\vec{A}=A_x\hat{x}+A_y\hat{y}+A_z\hat{z}$. The mathematical representation for a divergence in the magnetic vector potential $\vec{A}$ is $\nabla \cdot \vec{A}$, which corresponds to $$\frac{\partial A_x}{\partial x}\hat{x} + \frac{\partial A_y}{\partial y}\hat{y} + \frac{\partial A_z}{\partial z}\hat{z}.$$

A divergence can be thought of as a point source.

Figure 5B:
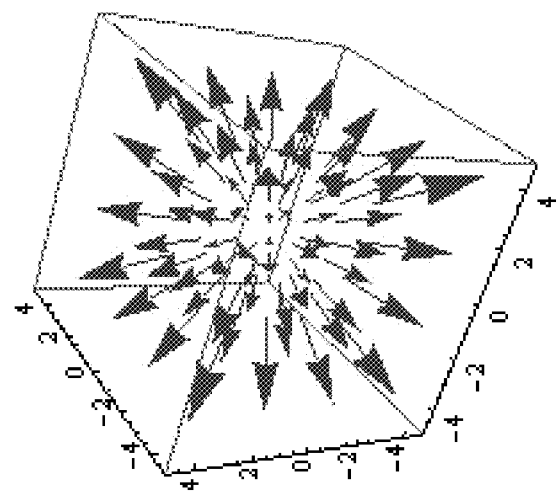
FIG. 5B shows a visual representation of the divergence $\nabla \cdot \vec{A}$ in 3D.
Figure 5A:
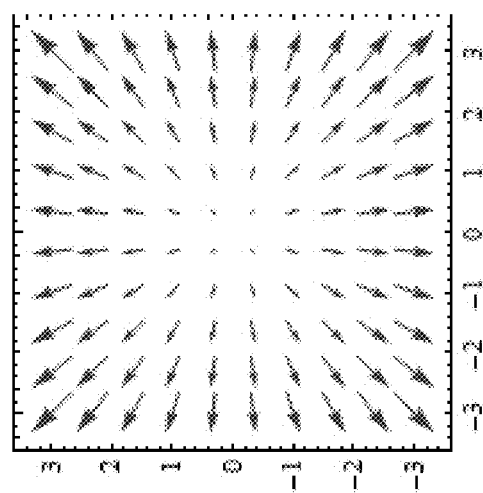
FIG. 5A shows a visual representation of the divergence $\nabla \cdot \vec{A}$ in 2D.

FIG. 5A shows a visual representation of the divergence $\nabla \cdot \vec{A}$ in 2D. The vertical and horizontal axes correspond to distances in the two dimensions. A point source of $\vec{A}$ is located at the origin position {0,0}. The arrows indicate a direction of the magnetic vector potential $\vec{A}$ at select positions. As can be seen, the arrows diverge away from the origin. The size of the arrows is for better visualization, and does not correspond to a magnitude.

FIG. 5B shows a visual representation of the divergence $\nabla \cdot \vec{A}$ in 3D. As with FIG. 5A, the point source is located at the origin position {0,0}. Note that there is no curl in the vector fields of FIGS. 5A and 5B. If a divergence in the magnetic vector potential $\vec{A}$ can be created, then the curl can be avoided, and a magnetic field $\vec{B}$ would not be created as a result of the diverging magnetic vector potential $\vec{A}$.

A divergence in the magnetic vector potential $\vec{A}$ can create an electric field without an accompanying magnetic field when the diverging magnetic vector potential $\vec{A}$ has a certain dependence on time. The relationship between $\vec{A}$ and $\vec{E}$ in this context is as follows:

$$\frac{\partial(\nabla \cdot \vec{A})}{\partial t} = \nabla \cdot \frac{\partial \vec{A}}{\partial t},$$

and since $$\vec{E} = -\frac{\partial \vec{A}}{\partial t},$$

we then have $$\frac{\partial(\nabla \cdot \vec{A})}{\partial t} = \nabla \cdot \frac{\partial \vec{A}}{\partial t} = -\nabla \cdot \vec{E}.$$

Thus, a divergent magnetic vector potential $\vec{A}$ that is changing over time equals a divergent electric field $\vec{E}$.

As described in the equations above, a time-varying divergent magnetic vector potential $\vec{A}$ creates a divergent electric field $\vec{E}$. There is no magnetic field $\vec{B}$ resulting from the $\vec{A}$ created from the skin effect because there is no curl (no vorticity) of the magnetic vector potential $\vec{A}$. This is because there is no curl in a diverging vector field.

III. Skin Effect

A time-varying divergence in the magnetic vector potential $\vec{A}$, which produces a divergent electric field $\vec{E}$, can be produced using various conductors including wires, plates, or spheres, using various materials, geometries, and designs. As stated above, conductors are presently used to conduct currents down the length of a wire, which produces a gradient in $\vec{A}$ and an ensuing curl of the magnetic vector potential $\vec{A}$ in the direction of the current flow. Typical operation is not designed to produce a skin effect, which, when optimized, can produce a divergence of the magnetic vector potential $\vec{A}$ when there are time-varying currents within conductive wires.

FIGS. 6A-6C provide cross-sectional views of a conductive wire 600 carrying different types of currents to illustrate the skin effect according to embodiments of the present invention. In FIG. 6A, the current remains constant and is DC. When the voltage is constant to provide a constant current, the current is composed of electrons moving along the wire throughout the entire wire. This is illustrated by the wire being completely shaded (region 610a), with shading indicating current flowing through the wire.

In FIG. 6B, the current changes moderately through time and is low frequency AC. The skin effect can be seen in FIG. 6B. Region 610b corresponds to where current can flow along wire 600. Region 620b corresponds to where no or minimal current is flowing along wire 600. The restriction of current to an outer ring of wire 600 when current is changing (i.e., AC character of current) is called the skin effect, so termed as the current stays near the skin (outer surface) of the wire.

In FIG. 6C, the current changes quickly through time and is high frequency AC. Region 610c corresponds to where current is flowing along wire 600. As one can see, region 610c is smaller than region 610a, as the frequency is higher for FIG. 6C. Region 620c corresponds to where no or minimal current is flowing along wire 600. Region 620c is larger than region 610b. The depth of the region through which current flows (i.e., 610b and 610c) is called the skin depth.

Besides a smaller region where current flows, the skin effect can cause electrons to move from the center of the wire outward to the surface of the wire, as is depicted by arrows 630. This motion will be discussed in more detail below.

Typically, the skin effect is viewed as a nuisance since the result is a smaller region through which current can flow. As the region for current flow is smaller, resistance increases.

Thus, resistance varies inversely with the skin depth. Accordingly, standard techniques try to eliminate the skin depth. In contrast, embodiments described herein beneficially use the skin effect.

A. Cause of Skin Effect

Figure 7:
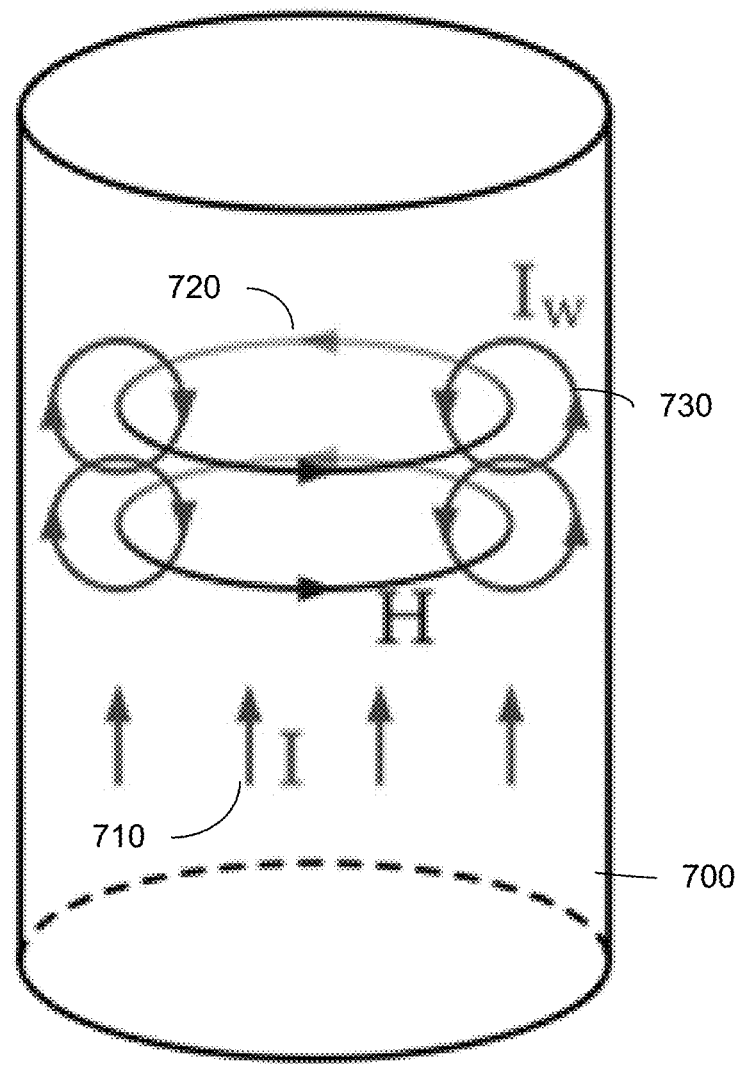
FIG. 7 illustrates eddy currents within a wire 700 that cause the skin effect. Wire 700 is shown with the current 710 (label I) in the up direction.

FIG. 7 illustrates eddy currents within a wire 700 that cause the skin effect. Wire 700 is shown with the current 710 (label I) in the up direction. Current 710 causes a magnetic field 720 (label H) to be generated within wire 700. As current 710 is time-varying, magnetic field 720 is also time varying, which generates an induced current 730 (labeled $I_W$). Induced current 730 (eddy currents) opposes current 710 toward the middle of wire 700, thereby causing no or minimal current to flow in the middle of wire 700.

The effect of induced current 730 decreases towards a surface of wire 700. Thus, there is an allowance of current flow at the surface. The higher the change (frequency) in current, the larger the induced current, and thus a smaller depth through which current will flow at the surface. Note that induced current 730 opposes an increase in magnetic field 720.

B. Skin Depth

The AC current density J in a conductor decreases exponentially from its value at the surface $J_S$ according to the depth d from the surface, as follows:

$$J = J_s e^{-\frac{d}{\delta}}$$

where $\delta$ is called the skin depth. J is the current density at depth d. $J_S$ is the current density at the surface of the wire. The value d is the depth from the surface in meters. The value $\delta$ is the skin depth in meters (or other common unit as d).

The skin depth is thus defined as the depth below the surface of the conductor at which the current density has fallen to 1/e (about 0.37) of $J_S$. In normal cases, the skin depth is well approximated for a given material operating at a given frequency as:

$$\delta = \sqrt{\frac{2\rho}{\omega\mu_0}} = \sqrt{\frac{2\rho}{2\pi f \mu_0}},$$

where $\rho$ is resistivity of the conductor, $\omega$ is the angular frequency of current ($2\pi \times$ frequency), f is the frequency of the current, and $\mu_0$ is the permeability of free space.

FIG. 8 shows a plot of skin depth vs. frequency for copper, gold, silver, aluminum, zinc, and carbon. The vertical axis of skin depth in millimeters. The horizontal axis is frequency in hertz. As one can see, the higher the frequency, the smaller the skin depth. In some aspects, a small the skin depth is advantageous for embodiments, as there is more movement of electrons to the surface. Various types of metals can be used for the input conductor.

IV. Skin Effect and Pulses Creating Divergent A

As described above, time-varying currents are conducted only down the length of a conducting wire in conventional systems, as shown in FIG. 1A. In such systems, the skin effect is reduced or eliminated when possible by design. Unlike conventional electrical systems that are designed to produce coupled electromagnetic fields and reduce the skin effect, embodiments can create divergent electric fields without accompanying magnetic fields. To do this, embodiments seek to utilize, and can maximize, the skin effect in conductive wires to create a time-varying divergent magnetic vector potential $\vec{A}$, which in turn creates (generates) divergent electric fields without accompanying magnetic fields.

Because the skin effect is generated by time-varying currents, with dI/dt being the rate of change of current in the wire, a way to optimize the skin effect is to increase dI/dt. Additionally, to avoid accompanying magnetic fields, it is desirable to suppress current flow and electric and magnetic fields generated in a wire. A minimization of the conventionally coupled electric and magnetic fields is achieved by less overall current flow I through the wire.

To achieve a high dI/dt on minimizing current flow I, embodiments use voltage pulses with very short rise times (e.g., less than 30 ns). Ideally, the pulses are composed strictly of a rising edge and a falling edge, and thus can resemble a triangular waveform. A very high voltage can be used to obtain a very large increase in voltage over time, and thus a high dI/dt. The pulses can also be of short width (e.g., less than 1 nanosecond, 10 nanoseconds, 100 nanoseconds, a microsecond, 10 microseconds, or 100 microseconds) so as to limit an amount of current flowing through the conducting wire. The use of voltage pulses to provide a divergent magnetic vector potential is described below.

A. Movement of Electrons to Surface

During a rising edge of a voltage pulse, the voltage in the wire increases rapidly. This rapid increase in voltage causes a large dI/dt. Looking back at FIG. 7, the large dI/dt will cause a large dH/dt, which in turn leads to a large induced current 730. A large induced current can help to prevent an appreciable amount of current from flowing. And, induced current 730 causes electrons to flow toward the surface, as depicted by arrows of induced current 730 toward the surface. The induced current is less at the surface, and thus emf that would cause the electrons to move back toward the center is less than the emf pushing the electrons toward the surface. Accordingly, the more rapidly current changes through time, the more electrons diverge to the outer regions of the wire, as shown in FIGS. 6A-6C.

Figure 9C:
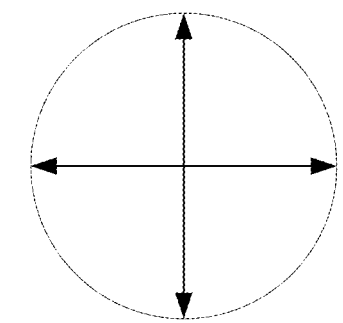
FIG. 9C shows a motion of electrons radially outward in a wire 900 during a rising edge of a second pulse.
Figure 9B:
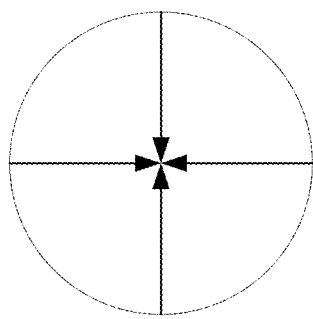
FIG. 9B shows a motion of electrons through the inward in wire 900 during a falling edge of the first pulse to a zero voltage.
Figure 9A:
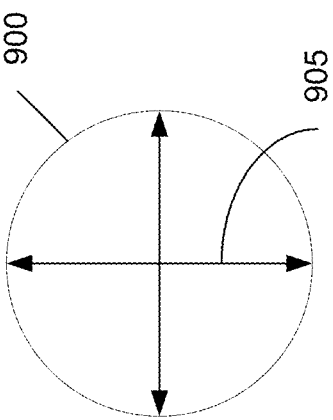
FIG. 9A shows a motion of electrons radially outward in a wire 900 during a rising edge of a first pulse.

FIG. 9A shows a motion of electrons radially outward in a wire 900 during a rising edge of a first pulse. During a rising edge, the large dI/dt causes a significant skin effect, which causes movement of electrons to the surface of wire 900. The radial outward motion is depicted with arrows 905.

FIG. 9B shows a motion of electrons inward in wire 900 during a falling edge of the first pulse to a zero voltage. At the end of the first pulse, the voltage is zero, and thus the change in current is zero. At the end of the first pulse, there is no skin effect as there is no voltage or current, which results in the electrons moving back to a state of equilibrium by some electrons moving towards the middle of wire 900. With the skin effect removed, the electrons are no longer being pushed toward the surface, which allows a movement towards the center that would be positively charged as a result of the radial movement during the rising edge. The rising edge and falling edge of the voltage pulses can be asymmetric. For example, the rising edge can increase faster than the falling edge decreases.

FIG. 9C shows a motion of electrons radially outward in a wire 900 during a rising edge of a second pulse. Since the electrons move back towards the center after the end of the first pulse, the electrons can now move to the surface when the rising edge of the second pulse occurs. In this manner, a divergence from the center of the wire can be generated.

The slew rate (increase in voltage over time) relates to a frequency. Thus, the skin effect can be maximized by increasing the slew rate. A large voltage over a short period of time can be used to increase the slew rate. Results below show that the total rise time can effect a strength of a voltage induced in an output circuit.

B. Radial Outward Time-Varying A (Movement to Surface)

Given the radial motion of the electrons in response to large and rapid voltage pulses, a radial magnetic vector potential $\vec{A}$ will result. Since a magnetic vector potential $\vec{A}$ is in a radial direction, $\vec{A}$ would have a nonzero divergence, and no curl. Thus, there would be no magnetic field as a result of the magnetic vector potential $\vec{A}$.

FIG. 10A shows a cross-sectional view of a wire 1000 with a radial magnetic vector potential 1010 produced from voltage pulses according to embodiments of the present invention. The arrows represent the divergent magnetic vector potential $\vec{A}$ around the wire. As explained above, the electrons moving in the magnetic field will be pushed to the surface. Thus, a radial current will exist toward the edge, thereby generating the radial outward $\vec{A}$.

FIG. 10B shows a perspective view of wire 1000 and the radial magnetic vector potential 1010 having a nonzero divergence according to embodiments of the present invention. As one can see, magnetic vector potential 1010 does not have a curl, and thus would not generate a magnetic field, which can cause a limiting effect on the production of voltage pulses in wire 1000. In this manner, power is not wasted having to overcome such a magnetic field, and operation can be more efficient.

Magnetic vector potential 1010 can be considered to be longitudinal if it does not have a curl. Also, magnetic vector potential 1010 is not part of a transverse wave of coupled electric and magnetic fields. The magnetic vector potential varies in a direction of propagation of the magnetic vector potential. The longitudinal wave increases and decreases in correspondence to voltage pulses, where $\vec{A}$ decreases to zero between pulses. Accordingly, the radial expansion of electrons in wire 1000 can induce a longitudinal wave in magnetic vector potential.

When done properly, the rapidly time-varying divergence in the magnetic vector potential $\vec{A}$ around the wire will create a high voltage electric field extending directly out of the wire perpendicularly in a 360 degree radius as shown in FIGS. 10A and 10B. This radial magnetic vector potential is time-varying at a rate consistent with the voltage pulses.

The oscillation of the magnetic vector potential can be controlled to provide a desired electric field, which can be used for a variety of purposes (e.g., inductive charging and communications). For example, the slew rate of the voltage pulses can be used to determine an instantaneous magnitude of the electric field, and the duration of the rise time can correspond to an amount of time that an electric field is generated. Further, the duty cycle of pulses can be used to control an average magnitude of the resulting electric field. As the benefit is obtain in the edges of the pulse, the width of the pulse can be kept small so that current does not flow in the input circuit (conductor).

A time variance of the electric field can be dictated by second and higher derivatives in the $\vec{A}$ generated during a rise time of the voltage pulse. The electric field has a same direction or opposite direction, depending on how $\vec{A}$ is changing over time (e.g., increasing or decreasing). For example, if $\vec{A}$ is increasing over time, then the electric field would be in the opposite direction. If $\vec{A}$ is decreasing over time, then the electric field would be in the same direction. And, the pattern of pulses can determine a time variance of the electric field. For example, pulses can be sent in bursts, followed by no pulses for a specified duration, thereby providing a time variation of the electric field.

C. Reduction of Current Along Wire

As described above, it is desirable to limit the amount of actual current along the wire, as such current causes a magnetic field to overcome. If the voltage pulse has sufficient properties (e.g., rise time and pulse width), the current does not reach an appreciable value because the current is increasing over a very short period of time. The voltage begins to decrease before an appreciable amount of current can flow, and thus a generation of an opposing magnetic field is avoided. Accordingly, the generation of a short voltage pulse is beneficial. A voltage pulse can be generated using a switching mechanism to obtain a short width for the pulse.

The properties of the rising edge can dictate an amount of radial movement of electrons, and thus an amplitude of the radial magnetic vector potential. The falling edge would be fast enough so that the voltage reaches zero before a next voltage pulse is to be provided. The rate of the voltage pulses can be selected to provide an electric field with a desired property. A pulse width would limit maximum frequency of the voltage pulses.

The biggest change in current occurs between the time there is no current and when the current starts to flow. This is when dI/dt is highest. In an inductor (all wires have some aspects of inductance), dI/dt starts off at a maximum, and then exponentially falls off to zero, if a constant current was ever achieved. Thus, the desirable high dI/dt can be achieved when I is a zero, which is also desirable. Further, the skin effect impedes the generation of current, as do other capacitive and inductive effects at the initial moment that voltage increases from zero. For instance, once the electrons begin to move, the electrons encounter eddy currents and a force that pushes the electrons to the surface. Thus, in the very short period of the rising edge of the pulse, an appreciable amount of current does not flow.

The reduction in current can also be thought of as occurring due to the opposing emf of the self-inductance of the wire: emf=−L×dI/dt. When there is a higher dI/dt, the opposing emf is larger. The pulses can provide a large dI/dt. Also, if the inductance is higher (e.g., in a solenoid), then the current can be reduced to a greater extent.

A purpose of having a short voltage pulse is to stop generation of current when the amount of current becomes appreciable. At that moment, the voltage pulse can stop, e.g., by opening a switch in the circuit. Thus, an appreciable magnetic field will not be generated. And, an appreciable amount of energy is not imparted to the inductor, which would otherwise provide a massive inductive kickback in the voltage. In this manner, the amount of energy used can be minimized. And, the use of pulses can continue to provide the dI/dt, without the ultimate power required once a current starts.

V. Pulses

Embodiments can use fast transition DC voltage pulses. The voltage pulses can be designed to maximize the skin effect in bursts. The pulses can be designed with desirable rise times, amplitudes, and pulse rates (i.e., the number of pulses per unit time). As described above, voltage pulses can cause electrons to move to the surface, but at the end of the pulse, the electrons move back. This effect can continue through a series of pulses, which can create the diverging magnetic vector potential, and a resulting electric field. The pulses can be periodic, non-periodic, periodic for some time segments, have a continuous change (increase or decrease) from one pulse to another (or between two sets of pulses), and other patterns. Control signals can be used to control the pattern of pulses.

A. Slew Rate/Rise Times

The slew rate of a pulse is the amount of increase in voltage per unit time. To provide a large dI/dt, a high slew rate is desired. The high slew rate acts as a high frequency, which leads to an increased skin effect and a larger magnetic vector potential. Thus, a high slew rate can maximize the skin effect, which can also lead to greater efficiency (i.e., less appreciable current flowing along the wire). A low slew rate can allow a current to begin to build up within the wire. Similarly, a long rise time can allow a current to begin to build up.

In one embodiment, a rise time of less than 30 ns can provide a sufficient magnetic vector potential for transmitting communication signals and for charging, or otherwise powering a load. The amplitude and resulting slew rate can be specified to provide sufficient voltage to power a load in an output circuit (e.g., an output coil) that is positioned to use the electric field resulting from the divergent magnetic vector potential. In various embodiments, the slew rate can be equal to or greater than 1V/30 ns, 150 V/μs, 10 V/ns, 50 V/ns, or 100 V/ns.

The rising edge and falling edge of the voltage pulses can be asymmetric. For example, the rising edge can increase faster than the falling edge decreases. A slower change in voltage for the falling edge can reduce the magnetic vector potential generated on the falling edge, and thus reduce any electric field from the falling edge. The switching mechanism can be used to control the rising and falling edge of the voltage pulse, as a switch does not happen instantaneously. For example, an insulated-gate bipolar transistor (IGBT) can have a longer falling edge than rising edge.

B. Pulse Rate

The pulse rate corresponds to the number of pulses per unit time. The pulse rate would affect the modulation of the magnetic vector potential $\vec{A}$ over time. Thus, the pulse rate affects the frequency of $\vec{A}$, which then affects $$\frac{\partial \vec{A}}{\partial t},$$

which in turn affects the resulting electric field. Thus, how often those pulses are coming through and potentially the rise time of that pulse is going to affect how the $\vec{A}$ field is changing over time. The pulse rate can be used to determine the primary frequency at which the $\vec{A}$ field is modulated. In various embodiments, the pulse rate can be equal to or greater than 1 kHz, 100 kHz, 500 kHz, 1 MHz, 1 GHz, or higher. The pulse rate of the series of input voltage pulses can provide a desired frequency for the time-varying magnetic vector potential.

C. Width

Embodiments can strive to use pulses having as small a width as possible. In various embodiments, a maximum width of a pulse is less than 100 μs, 10 μs, 1 μs, 100 ns, 10 ns, and 1 ns. As explained above, a short pulse width can help to reduce the amount of current along the wire. The width can be sufficiently small that the resulting pulse is extremely narrow and triangular or Gaussian in nature (i.e., no or little time of being at a constant voltage at the top of the pulse). The pulse width would also impact the maximum frequency for the pulse rate. An example pulse is provided in FIG. 15. An appropriate pulse width can depend on the conducting material used, the geometry of the input circuit (e.g., a type of coil), and a length and diameter of the input conductor, as well as the amplitude of the pulse. For example, a smaller amplitude can allow for a longer width before significant current is reached.

D. Amplitude/Voltage

The amplitude can impact the amplitude in the induced voltage in the output circuit. As is described below in section X, an increase in the amplitude of the input pulse in the input circuit affects the amplitude of the output pulse in the input circuit. Further, significant and unexpected increases can be seen at certain amplitudes.

To obtain a high and sustained slew rate, the total voltage achieved by the pulse would be high (e.g., 50V). If the voltage was only 5 or 10 V, then the maximum voltage would be achieved in a time less than 1 μs, and current would begin to flow when the maximum voltage is reached and sustained (i.e., if the pulse width was not sufficiently small). Other embodiments can use higher voltage, such as 500 volts, 1,000 volts, or 10,000 volts. The higher voltage allows the slew rate to be higher and affect the time dependence of $\vec{A}$. Thus, the amplitude can contribute to achieving a maximum dI/dt, and increasing the generated electric field.

Additionally, the higher amplitude of applied voltage can generate a higher slew rate in reaching the desired voltage, which can be less than the applied voltage. Typically, the pulse would reach the voltage of the power supply before a switch could open (i.e., cutting off the applied voltage). But, in some embodiments, the voltage in the wire may not reach the power supply voltage, but just reach a desired voltage, depending on the switching speed and the applied voltage. Having the voltage of the power supply being larger than amplitude of the voltage pulses can provide a higher slew rate. For example, the initial increase from zero volts can be very large. As a voltage increases in the wire, the rate of increase would become smaller as the amplitude of the logical pulse nears the voltage of the power supply. Thus, to reach the voltage of the power supply, the slew rate would decrease, which would show up as a rounding of the amplitude of the pulse. And, the power supply would have to be connected for a longer time, which could result in an appreciable amount of current along the wire.

Thus, having a power supply with the maximum voltage higher than an amplitude of the voltage pulse can maximize the resulting magnetic vector potential and minimize the current along the wire, and the resulting magnetic field. The amplitude of voltage pulse would correspond to a length of time that the power supply is connected via a switching mechanism. The falling edge of the pulse would have a shape that is dictated by the switching mechanism that opens to end the pulse. Since a switch is not perfectly instantaneous, the falling edge would have a certain decay shape, and the rising edge of the pulse would have a certain rising shape. Once the switch is completely open (i.e., circuit is separated from the power supply), the voltage can be effectively zero in the circuit, depending on the decay rate and the time until a next pulse.

E. Optimal Parameters

As described above, the properties of voltage pulses can impact the desired production of the divergent magnetic vector potential, and can reduce the unwanted generation of an opposing magnetic field that would result from current along the wire. In general, it is desirable to have pulses be short, have a large amplitude, and increase rapidly to obtain a short rise time. The optimal values can be expressed as a threshold value, above which or below which the values are desired. Thus, the optimal values can be a range determined by minimum or maximum values, where any value in the range is desired. The optimal values can depend on the properties of the system, e.g., a gauge of the wire and a shape of the wire (e.g., whether in a solenoid or straight wire).

In typical pulse operations, the increase in the voltage is so slow that an appreciable amount of current will be produced during the pulse. In contrast, voltage pulses produced by embodiments of the present invention can have properties that reduce or eliminate appreciable current.

In some embodiments, an optimal value of a maximum pulse width of 1 µs or less (e.g., less than 50 ns, 1-5 ns, or less than 1 ns). Such a width can cut off the pulse before an appreciable amount of current can begin to flow. The pulse width can be controlled with a switching mechanism. This allows for the utilization of the generated dI/dt while minimizing I. Slew rates greater than 10 V/ns, 50 V/ns, or 100 V/ns can be used. Rise times can be less than 30 ns, 20 ns, 10 ns, 1 ns, or 500 picoseconds.

In some embodiments, the voltage of the power supply can be at least 50 V (e.g., when the divergent magnetic vector potential and resulting electric field are used for communications) or at least 150 V (e.g., when the divergent magnetic vector potential and resulting electric field are used for power generation). Power supplies can have voltage of 500 V or upwards of 1000 V and 1500 V. Even when using 32 gauge wire, the use of very short pulses would still not short the wire as an appreciable amount (e.g., less than 50 micro amps or less than 1-3 milliamps) of current does not flow.

F. Power Usage and Curl-Free Magnetic Vector Potential

As described above, embodiments can apply a high slew rate over a short rise time to a piece of wire to generate a skin effect. The skin effect acts to limit the current rise in the wire, which uses less power. The desired effect is the faster rise time of the voltage pulse and fast drop, and not a sustained voltage that would be characteristic of power input. Thus, it is desirable to quickly reduce the pulse back down to zero, once the pulse reaches the desired voltage.

The effective resistance of the wire (e.g., in a coil geometry) is very high during the very short pulse because there is such a quick pulse that the effective reactance prevents the current from becoming large during the short time of the rising voltage of the pulse. Since the current flow during the voltage rise is minimal (e.g., due to capacitive effects, induced eddy currents, and other inductive effects), the power usage is relatively minimal.

And, the curl-free magnetic vector potential does not create a magnetic field, which would otherwise cause inefficiencies in wireless charging or wireless communications. And, the electrons that are going out radially do not encounter a large resistance moving towards the surface. That way, embodiments can actually get more of an appreciable current that is moving towards the surface than going down the wire. Accordingly, embodiments can provide a method of generating a curl-free magnetic vector potential for inducing an output voltage in an output circuit.

VI. Dependence of A and E on Pulses

As the pulses are used to generate the time-varying and divergent magnetic vector potential $\vec{A}$, which corresponds to an electric field emanating from the conductor (e.g., straight wire or coil), the pulses can be used to create a desired $\vec{A}$ and $\vec{E}$. For example, a time variance of the electric field can be determined by second and higher derivatives in the $\vec{A}$ generated during a rise time of the voltage pulse. Thus, the exact shape of the rising edge of the voltage pulse can impact the time dependence of $\vec{A}$, and therefore impact the time dependence of $\vec{E}$ since $$\vec{E} = -\frac{\partial \vec{A}}{\partial t}.$$

The pattern (rate) of pulses can determine a time variance of the electric field. For example, during a voltage pulse, the electric field can exist and have a strength that is related to a slew rate of the pulse. When the voltage pulse drops back to zero, the magnetic vector potential $\vec{A}$ will be zero, and the electric field will be zero. Thus, the time dependence of the voltage pulses impacts when an electric field is created and when it is not. Therefore, the voltage pulses provide pulses of electric field. The width and rate of the pulses width can determine when an electric field is produced, as they determine when no electric field is generated (i.e., when the voltage pulse is zero). A duty cycle of the voltage pulses is a function of the width and the pulse rate. A higher overall duty cycle can provide a longer amount of time that an electric field is being generated. But, the pulse width and rise time should be kept relatively low so as not to produce an appreciable current.

When the electric field is being produced, current can be produced in an output coil that is arranged to receive the electric field pulses. The electric pulses can provide bursts of current in a load in the output coil. If the pulse rate is high enough, the current in the load might appear relatively constant, or at least provide a same functionality as a constant electric field. The strength of the overall electric field for driving the load can be controlled by the duty cycle, and thus controlled by the width of the pulses and the pulse rate. In various embodiments, a duty cycle of 20%, 10%, 5%, 1%, 0.5%, 0.1%, or less can be used.

Further, if a high pulse rate is possible, a lower applied voltage may be used. For example, if the pulse rate could approach the rise time of a pulse, the width of a pulse could be reduced, with a corresponding increase in the pulse rate, without the total generated electric field being compromised. With the pulse width smaller, the total time for the rising edge can be less, and thus a total voltage achieved being less.

The pulses can be provided in a pattern, e.g., not always with uniform periodicity. For example, a series of pulses can be applied (e.g., over 10 microseconds), followed by 3 microseconds of no pulses. The pattern can be of any duration of pulses being applied and not being applied. Pulse rates can change during a period of applying pulses, e.g., pulses could increase in frequency of decrease in frequency in a continuous fashion (e.g., each pulse occurring faster or slower than the last one). All of this variation can affect the overall time dependence of the electric field being generated. This, time dependence can be used to encode data, which can be decoded, e.g., via current in an output coil. As examples, the encoding can be based on amplitude modulation or frequency modulation. As another example, a series of pulses could be a binary 1, and a pause in pulses could be a binary 0.

Further, the electric field would decrease with increasing distance from the conductor. The electric field would decrease as $1/r^2$, where r is the distance from the conductor.

VII. Input Coils

In some embodiments, the conductor to which the voltage pulses are provided forms a coil, e.g., a solenoid or toroidal coil. Such coils can provide additional reactance for reducing current, due to capacitive and inductive effects of the coil. Also, the shape of magnetic vector potential and resulting electric field would differ based on the geometry of the input coil. The geometry for the input coil can also be chosen so as to reduce or eliminate interaction with any fields created by a current in the output coil that is induced by the electric field from the input coil.

As described above, the resulting reactance for a coil can be larger than a straight wire. Given the high reactance, a high voltage (e.g., 1,000 or 10,000 V) can be used for the voltage pulses without burning of the coil. The more turns within the coil can provide an increase in the inductance, limiting the current along the wire. The wire of the coils (or other input conductors) can have a length of at least 1 foot, 10 feet, 100 feet, 500 feet, 1,000 feet, or longer. As examples, the diameter of the wire of the coils can be 20 AWG, 25 AWG, 30 AWG, 35 AWG, or 40 AWG.

A. Toroidal Coil

Figures 11A, 11B:
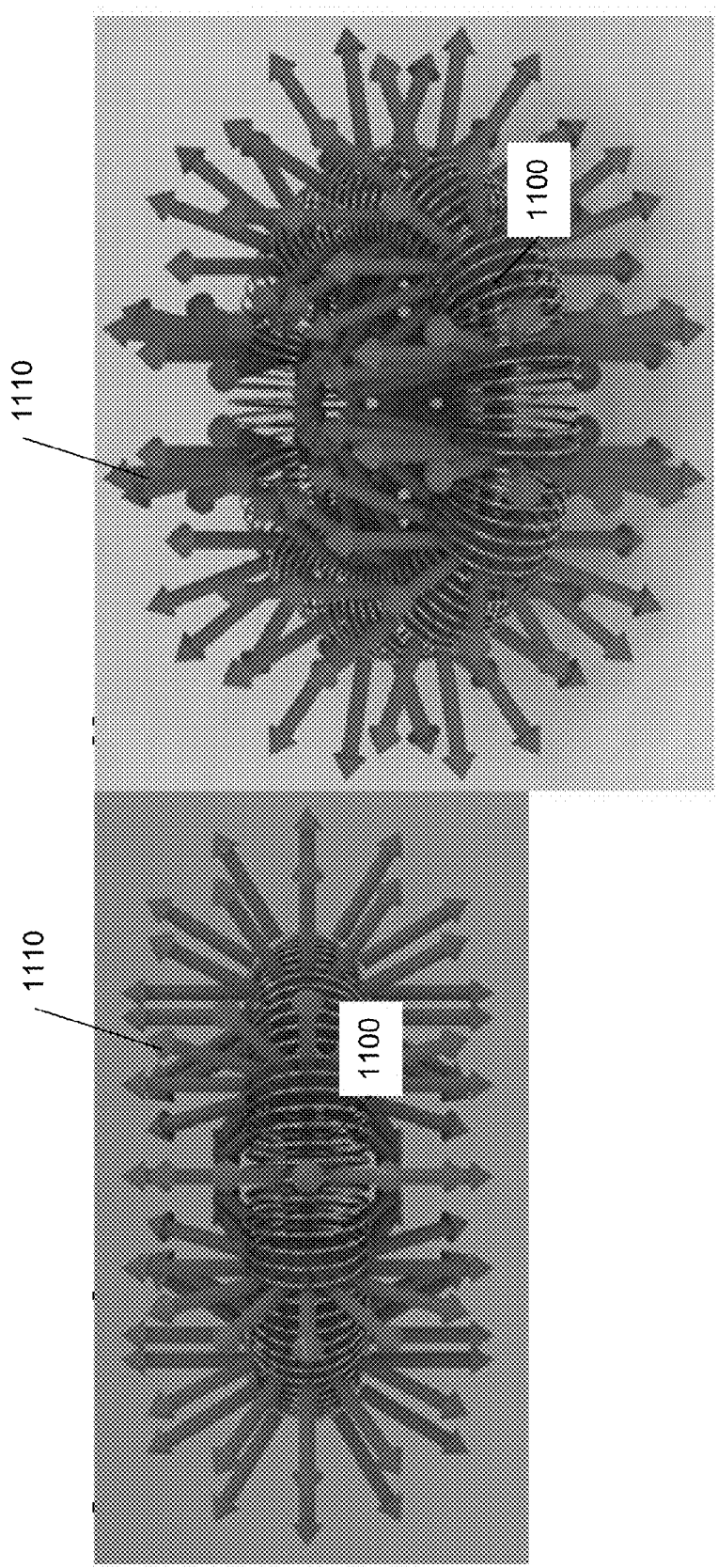
FIG. 11A shows a side view of a toroidal coil 1100 with a radial magnetic vector potential 1110 produced from voltage pulses according to embodiments of the present invention.
FIG. 11B shows a perspective view of toroidal coil 1100.

FIG. 11A shows a side view of a toroidal coil 1100 with a radial magnetic vector potential 1110 produced from voltage pulses according to embodiments of the present invention. FIG. 11B shows a perspective view of toroidal coil 1100. The magnetic vector potential 1110 is diverging as shown. This is in sharp contrast to the geometries of the magnetic vector potential $\vec{A}$ around a toroidal coil in conventional designs (see FIGS. 2A and 2B). As one can see, there is no curling or voracity in the magnetic vector potential $\vec{A}$ radiating from the coil. The resulting electric field $\vec{E}$ would be in a corresponding direction as magnetic vector potential 1110. The magnetic field of FIGS. 2A and 2B is absent.

B. Cylindrical Solenoid

Figure 11C:
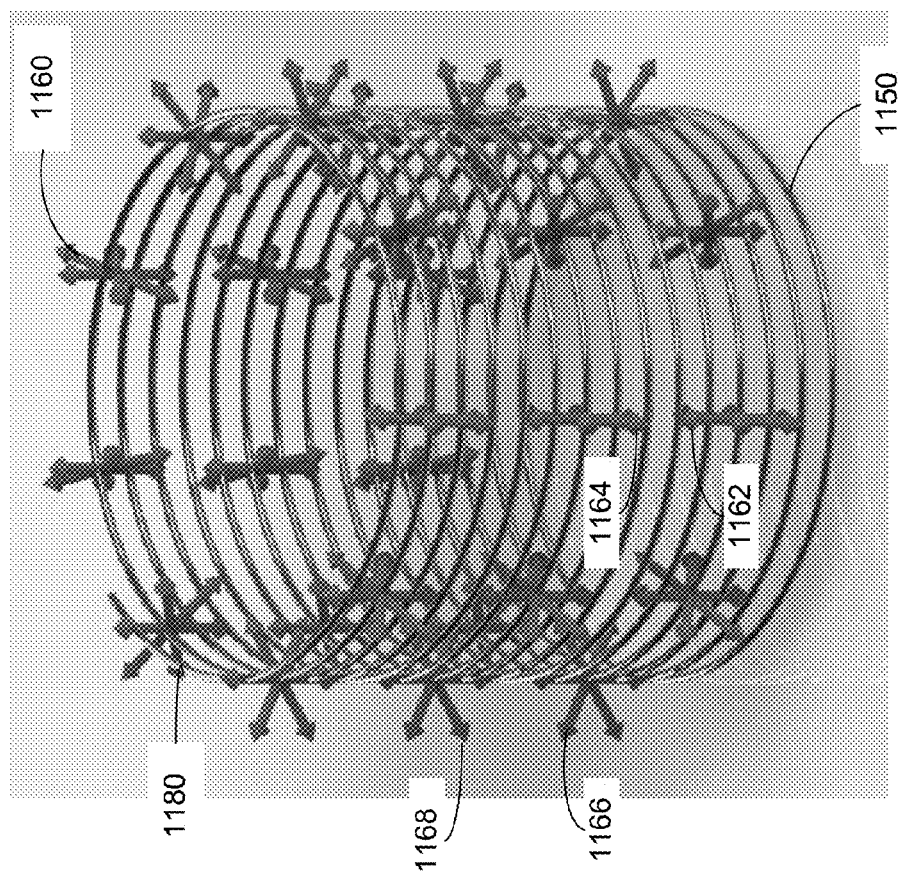
FIG. 11C shows a solenoid 1150 from which a radial magnetic vector potential 1160 is produced according to embodiments of the present invention.

FIG. 11C shows a solenoid 1150 from which a radial magnetic vector potential 1160 is produced according to embodiments of the present invention. Magnetic vector potential 1160 is shown radially emanating from various points on the coil of solenoid 1150. Magnetic vector potential 1160 can be produced, as described above, by applying voltage pulses.

Magnetic vector potential 1160 from windings that are next to each other can cancel out in some directions, as the magnetic vector potential 1160 is produced in all directions. For example, arrow 1164 points down and arrow 1162 points up. For points on windings that are just above and below each other, the magnetic vector potential in the vertical direction (i.e., up and down) would be at substantially the same strength, and thus cancel each other out.

Further, arrows 1166 and 1168 can cancel each other out in the vertical direction, leaving only a horizontal component. Accordingly, the resulting magnetic vector potential at points radially distal from the coil can be solely in the horizontal direction. For example, a point in a plane that bisects the cylindrical solenoid can have components of magnetic vector potential 1160 only in the horizontal direction.

Points in planes that are further up or down from the bisecting plane can have components of magnetic vector potential 1160 in the vertical direction as such a plane would be offset from the middle, and thus more lines of magnetic vector potential 1160 would be received in the direction of the offset. For example, a first point near the top of solenoid 1150 would have more lines of magnetic vector potential 1160 reach it from points below the first point. Thus, there would be some electric field in the up direction.

Points that are directly above a top winding 1180, would have a vertical component to magnetic vector potential 1160, as there is no canceling component from another winding.

VIII. System

A. Block Diagram

Figure 12:
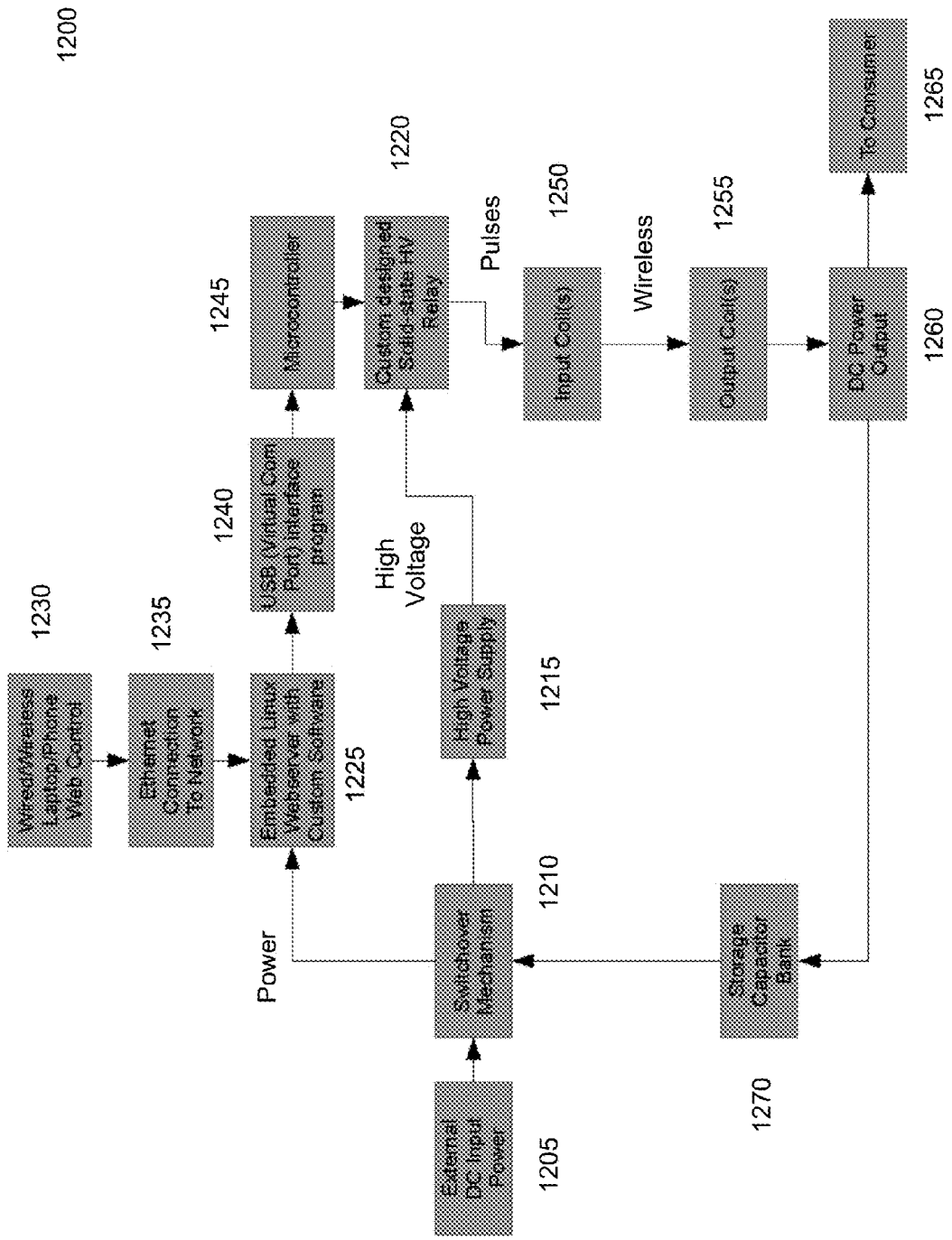
FIG. 12 is a block diagram of a system according to various embodiments of the present invention.

FIG. 12 is a block diagram of a system according to various embodiments of the present invention. DC input power 1205 (e.g., a battery or DC converter connected to AC power) can be used to provide a DC voltage to a high voltage power supply 1215. A switchover mechanism 1210 can be placed between DC input power 1205 and HV power supply 1215, also called a power supply circuit. Switchover mechanism 1210 can also be connected to a storage capacitor bank 1270, and be used to determine whether power is sent to HV power supply 1215 from either DC input power 1205 or capacitor bank 1270. Various circuits, as shown, can be communicably coupled to each other.

The HV power supply 1215 (e.g., a step-up converter) can increase the DC voltage from DC input power 1205, and provide the high voltage to a relay (switching) mechanism 1220, labeled as solid-state HV relay. Switching mechanism 1220 can control when HV power supply 1215 is connected to input coil 1250. Thus, HV power supply 1215 is selectably connected to input coil 1250.

Switching mechanism 1220 can be controlled by a controller 1245, which in turn can be controlled by a Web server 1225 that connects to controller 1245 via USB interface 1240. Switching mechanism 1220 can be configured to connect and disconnect input coil 1250 to the power supply circuit. Controller 1245 can send signals to switching mechanism 1220 to control a connection state of switching mechanism 1220. The signals can be of any suitable form, e.g., periodic, non-periodic, etc. In one embodiment, a user's computer 1230 (e.g., a laptop or phone) can use our network connection 1235 to connect to Web server 1225 to provide instructions for configuring controller 1245, which can be set such that switching mechanism 1220 provides the desired voltage pulses.

Controller 1245 can be on a separate ground from the high voltage circuit (i.e., switching mechanism 1220 and inputs coil 1250). Controller 1245 can have an opto-electronic connection to switching mechanism 1220 so as to electrically isolate controller 1245 from the high voltage circuits of 1215 and 1220. Controller 1245 would normally operate on 5, 10, 12, or 15 volts, whereas the high voltage circuits of 1215 and 1220 can operate on 50 V, 100 V, or more (e.g., 4,000 V).

In one implementation, switchover mechanism 1210 can provide power to Web server 1225. Data can be transmitted between elements 1225-1245. Pulses are provided from switching mechanism 1220 to input conductor 1250 (e.g., an input coil). The pulses can create a divergent magnetic vector potential and a resulting electric field that induces a voltage and current in output conductor 1255 (e.g., an output coil). Thus, the connection between input coil 1250 and output coil 1255 is wireless. As input coil 1250 does not directly generate a significant magnetic field, additional power is not required to overcome any opposing induced current that would result from such a magnetic field. Input coil can be situated in another device or material so that an output coil can be placed in a manner to receive the electric field created by the time-varying magnetic vector potential.

DC power output 1260 can be obtained from the current in output coil 1255. DC power output 1260 can be provided to a consumer 1265, or more specifically to a consumer device to operate the consumer device. Any excess power can be saved in capacitor bank 1270, which can be used to replace or supplement DC input power 1205 for operating HV power supply 1215. Switchover mechanism 1210 can monitor (e.g., with a processor) the voltage from capacitor bank 1270, and switch the supply power from DC input power 1205 to capacitor bank 1270 when sufficient energy is stored in capacitor bank 1270. Other energy storage devices besides a capacitor bank can be used, as would be known to one skilled in the art.

B. Parameters

System 1200 can have various settings, e.g., as described herein. The settings can be designed to maximize the dI/dt for pulses to input coil 1250, minimize rise time for pulses to input coil 1250, and minimize the current I within input coil 1250. As for voltage, it is generally better to have higher voltage to increase dI/dt. In various embodiments, HV power supply 1215 can provide voltage pulses of at least 50 V (e.g., for communications) and at least 150 V (e.g., charging and higher). In one embodiment, HV power supply 1215 can produce at least 1 kV, where the wattage is less critical.

As for switching by relays 1220, the faster the rise time and fall time of the applied voltage to the wire the better as this allows the utilization of the generated dI/dt while minimizing I. In one implementation, a maximum pulse width is 1 μs (or other values mentioned herein) and the rise time is less than 30 ns.

The inductance of input conductor 1250 can depend on circuit elements (e.g., coil geometry and conductor material) and applied voltage pulse, as described above. A higher inductance can help to limit I, while a lower inductance can help to maximize dI/dt. A balance can be achieved to identify suitable inductance. A resistance of the wire similarly depends on circuit elements, where a higher resistance can help to limit I. Each of the elements described above can be optimized in order to make use of the divergent skin effect. In one aspect, no ferromagnetic materials are used in and about the coils.

C. Control Circuitry

Control circuitry (e.g., controller 1245 and other elements such as 1225 and 1230) can create the pulses with a specific frequency (pulse rate) and pulse width (which may be independent per output). In devices consisting of more than one coil, the control circuitry can control the phase between pulses to the input coils, i.e., pulses coming out are at the same frequency but different phase with respect to pulses for a different input coil. For example, if three input coils are used, a phase can be set at 120 degrees, with all the coils operating at the same frequency. In one implementation, the pulse width can be independently changed per pulse.

D. Switching Circuitry

Switching mechanism 1220 can control the rise time and the fall time of the voltage pulse. The rise time can be faster when the switch can close faster. The exact form for the rising edge (e.g., slope, curvature, and exponential increase) can depend on the materials and configuration of the switching devices involved. The falling edge would have a certain decay shape. Once the switch is completely open (i.e., circuit is separated from the power supply), the voltage would be effectively zero in the circuit.

E. Basic Circuit

Figure 13:
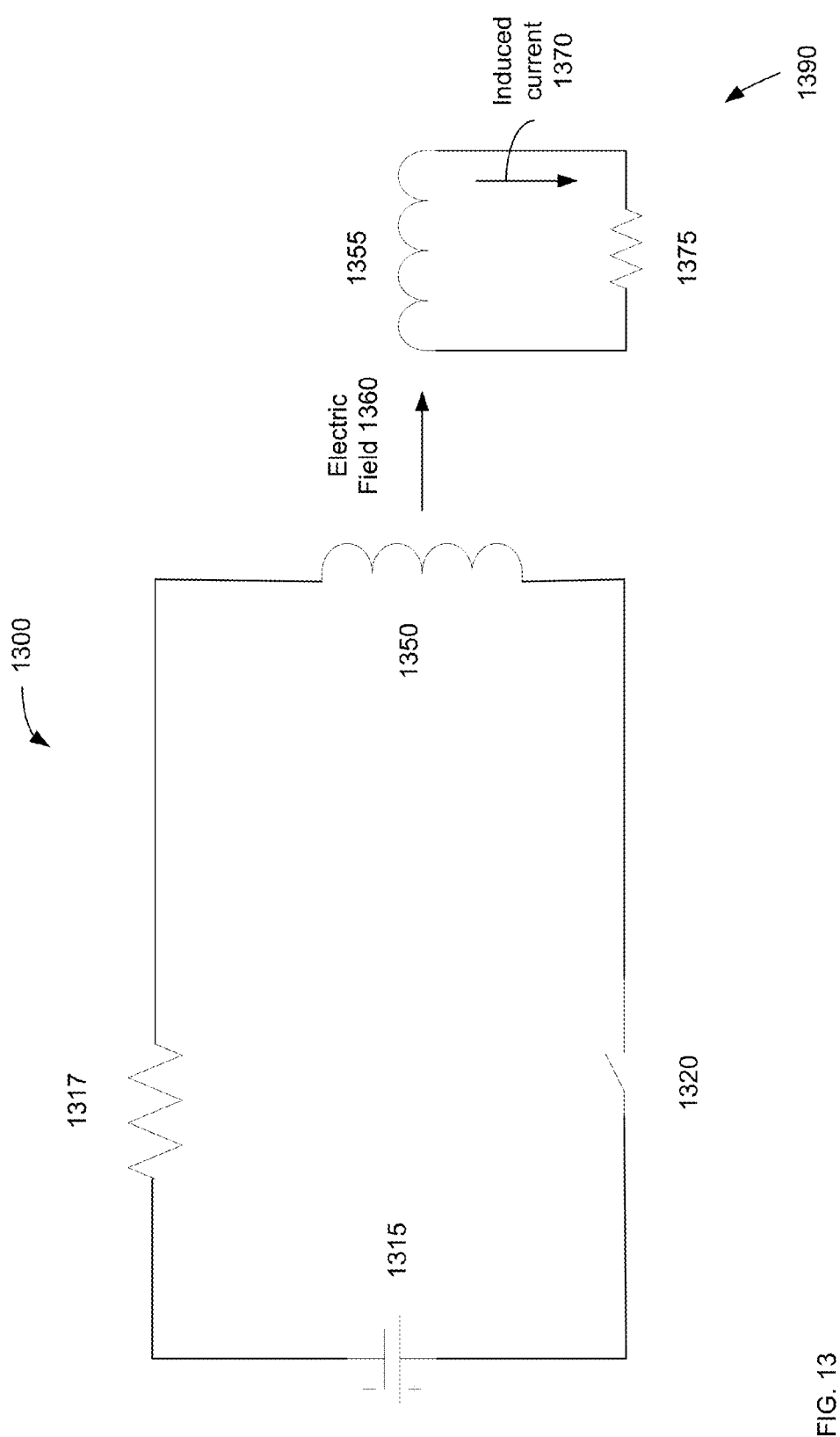
FIG. 13 shows a block diagram of a basic circuit 1300 illustrating aspects of system 1200 according to embodiments of the present invention.

FIG. 13 shows a block diagram of a basic circuit 1300 illustrating aspects of system 1200 according to embodiments of the present invention. The block diagram can correspond to an apparatus according to embodiments of the present invention. Circuit 1300 includes a voltage source 1315, a resistor 1317, an inductor 1350 (e.g., a solenoid or toroidal coil), and a switch 1320. Switch 1320 can be controlled by a controller to open and close to provide voltage pulses to inductor 1350. Resistor 1317 can represent resistance in a wire between voltage source 1315 and inductor 1350. The voltage pulses can create a curl-free magnetic vector potential as described above. Switch 1320 can be composed of various components and use various techniques for providing the voltage pulse, such techniques include magnetic pulse compression, MOSFET switched capacitors, and using a junction recovery diode. Various types of a solid-state switch can be used.

The curl-free magnetic vector potential can be used to induce current in a separate output circuit 1390, without limiting effects of the magnetic field that would normally be created by magnetic vector potential that had a curl. Output circuit 1390 can include another inductor 1355 or any load to be driven. Output circuit 1390 also include a storage device, such as a capacitor bank or other type of battery. Inductor 1355 (or other output conductor) can at least partially reside in a plane and that extends away from inductor 1350 (or other input conductor). Thus, output circuit 1390 can at least partially reside in the plane and extends away from the input conductor in the plane.

Electric field 1360 can induce a current 1370 that is used to drive a load 1375. Thus, inductor 1350 (or other input conductor) can be situated so that a current is induced in output circuit 1390 by electric field 1360. As examples, the input conductor can be situated by or along a surface, in a pad, adjacent a receptacle for a device containing output circuit 1390.

As an example, load 1375 can correspond to a power consuming circuitry, such as sensors, a battery, or a processor. Thus, the battery can be charged from the current. Electric field 1360 has a same direction or opposite direction as the magnetic vector potential from which the electric field is generated, depending on how the magnetic vector potential is changing over time. As the electric field changes over time, induced current 1370 would also change over time, and thus can be alternating current.

Output circuit 1390 can be used for communications applications. The induced signals in output circuit 1390 can include data signals, e.g., based on the pulse rate, existence of pulses during a time period, etc. The signals can be detected via any suitable technique, e.g., as voltages across a load. The voltages for communications can be less than for power and charging applications.

For power and charging applications, a higher voltage power supply can be used. The higher voltage power supply can provide higher slew rates for the voltage pulses, thereby creating larger changes in the radial magnetic vector potential. Further, a duty cycle of the voltage pulses can be used to control the amount of time that electric field 1360 is generated. A higher duty cycle can provide a stronger electric field 1360. Further aspects of power systems are described below.

F. Example Device

In one embodiment, a system comprises a 20 kV DC power supply, a polyethylene-based high power pulse capacitor bank rated at 0.119 uF @ 30 kV+, and an asymmetric switch. The system feeds a 28 AWG copper coil varying voltage levels up to 20 kV at varying pulse rates (cycles) per second. This enables the production of a radially produced electric field from the coil. To pulse the input coils with a fast 'slew rate' for the applied voltage or ∂V/∂t and to direct large quantities of switched pulses into varying numbers of input coils, a 6-channel, 1.5 kV solid state control system was designed. The coil can use varying gauges, e.g., down to 40 AWG.

In one implementation, the 0.119 uF capacitor bank includes pulsed power polyethylene capacitors with bleed-resistors. A switching mechanism can include a custom high slew-rate PCB switch, with a metal-oxide-semiconductor field-effect transistor (MOSFET) and/or IGBT.

IX. Producing Pulses with Short Rise Times

Further embodiments for providing short pulses (e.g., less than 30 ns) are provided below. An example circuit diagram is described, and an example input voltage pulse to an input conductor is described.

A. Circuit

FIGS. 14A-14E show an example circuit 1400 for providing short voltage pulses according to embodiments of the present invention. Circuit 1400 is also referred to as a pulse generator or a power supply circuit, which can include other components. A key for how FIGS. 14A-14E combine to provide circuit 1400 is provided in FIG. 14A. Part numbers are provided for most elements in circuit 1400. Such part numbers provide specifications for the components, e.g., capacitances, resistances, and inductances. Circuit can be embodied in various components of FIG. 12, e.g., in HV power supply 1215 and/or switching mechanism 1220.

Figure 14A:
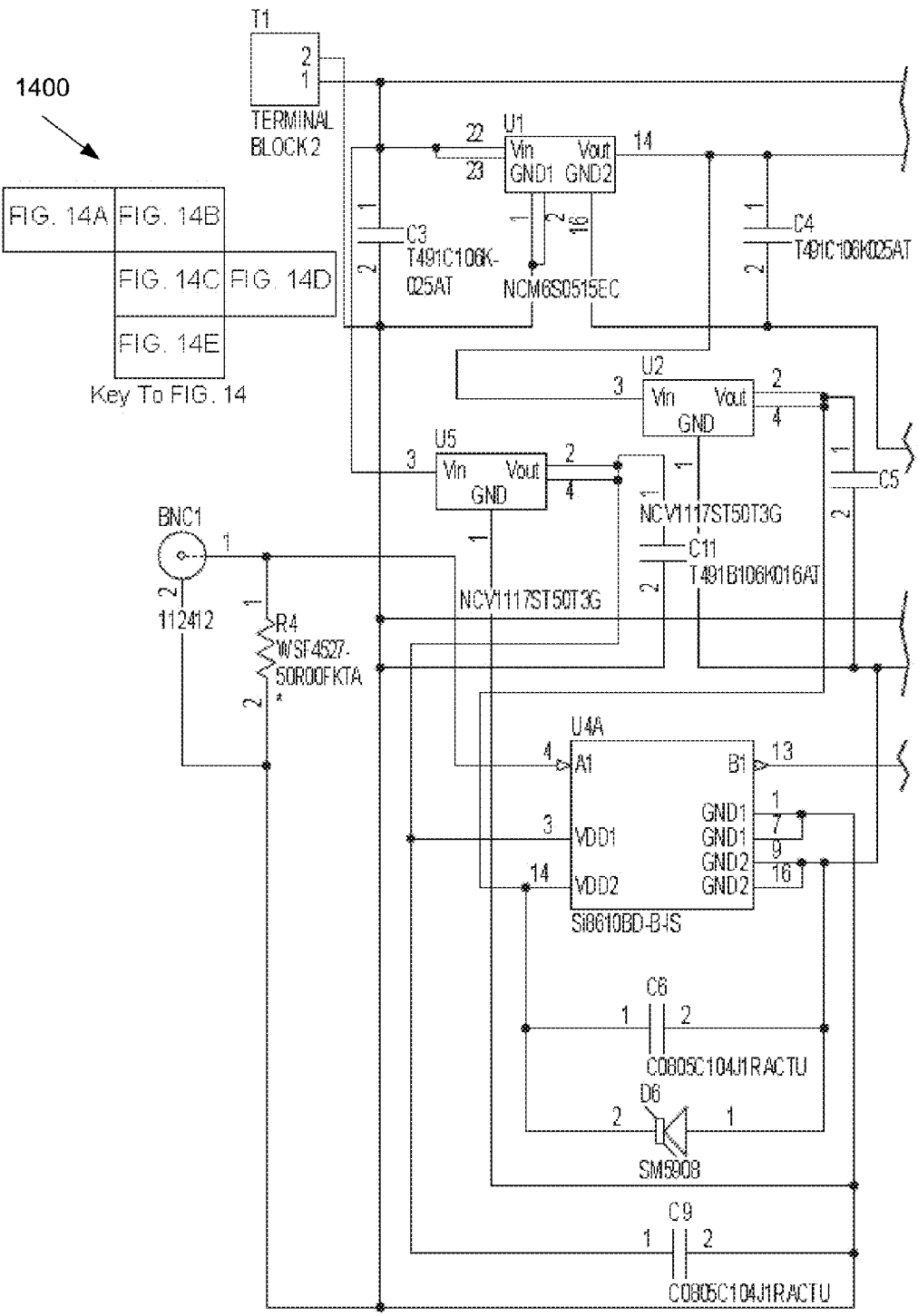
FIGS. 14A-14E show an example circuit 1400 for providing short voltage pulses according to embodiments of the present invention.
Figure 14B:
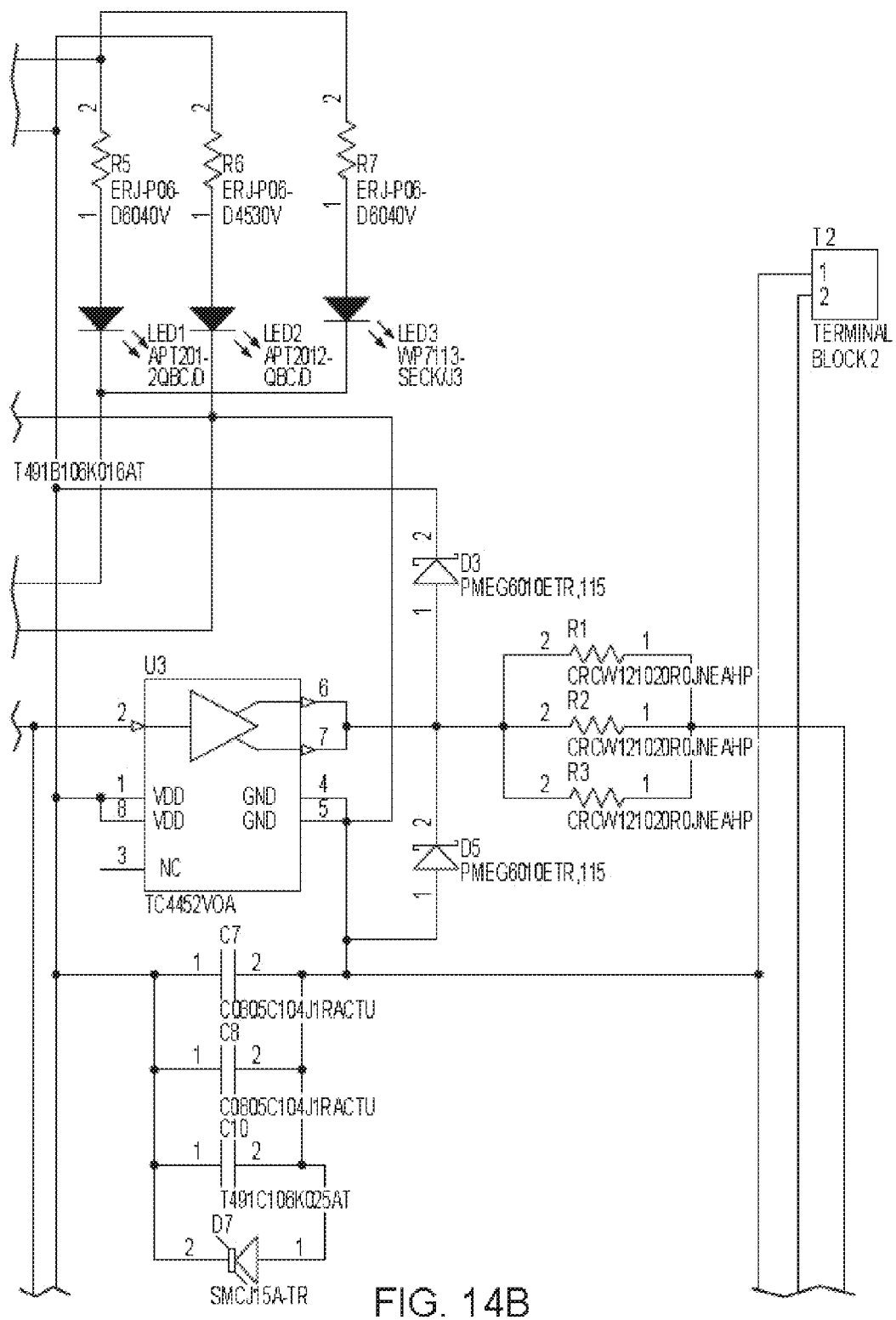
Figure 14C:
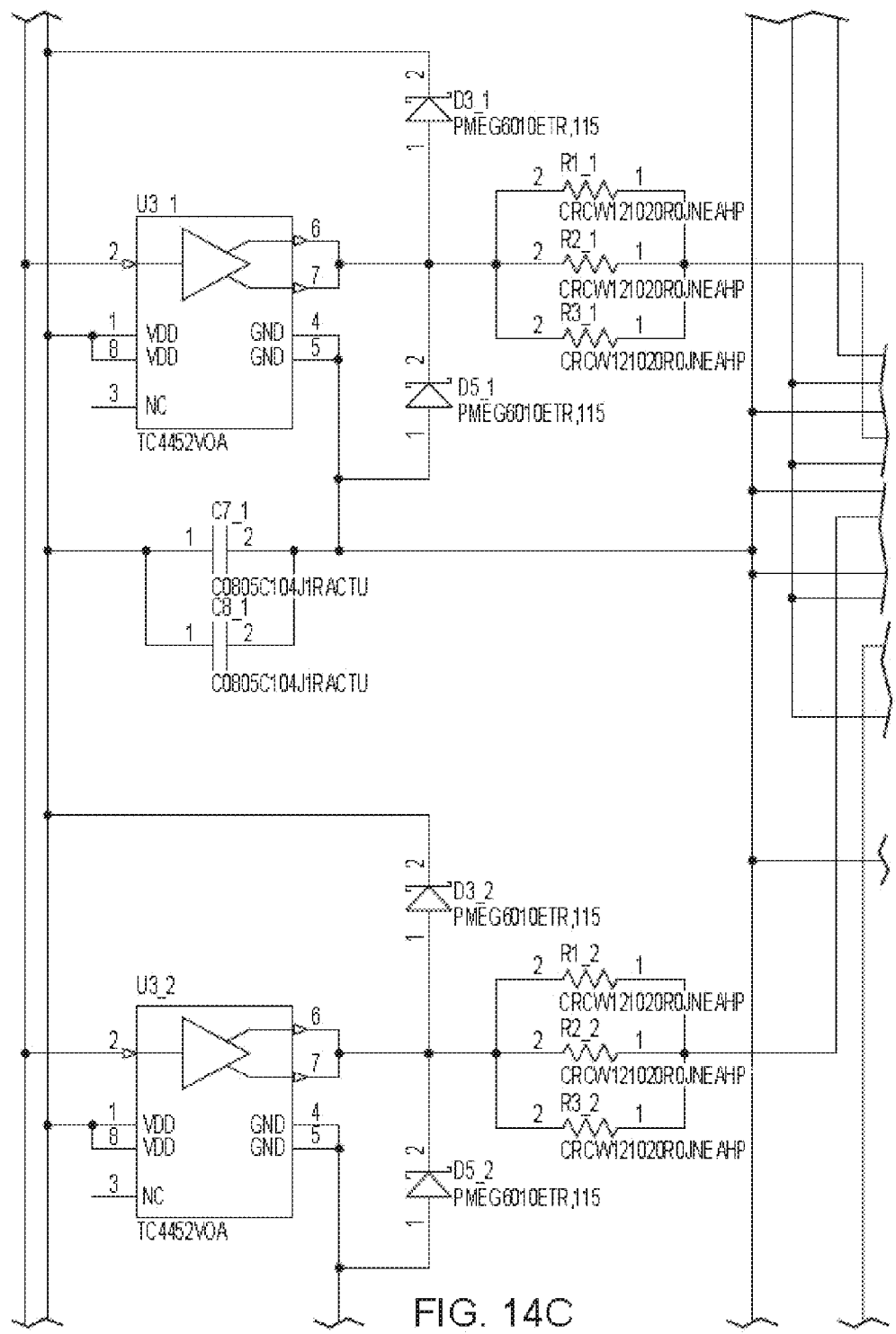
Figure 14D:
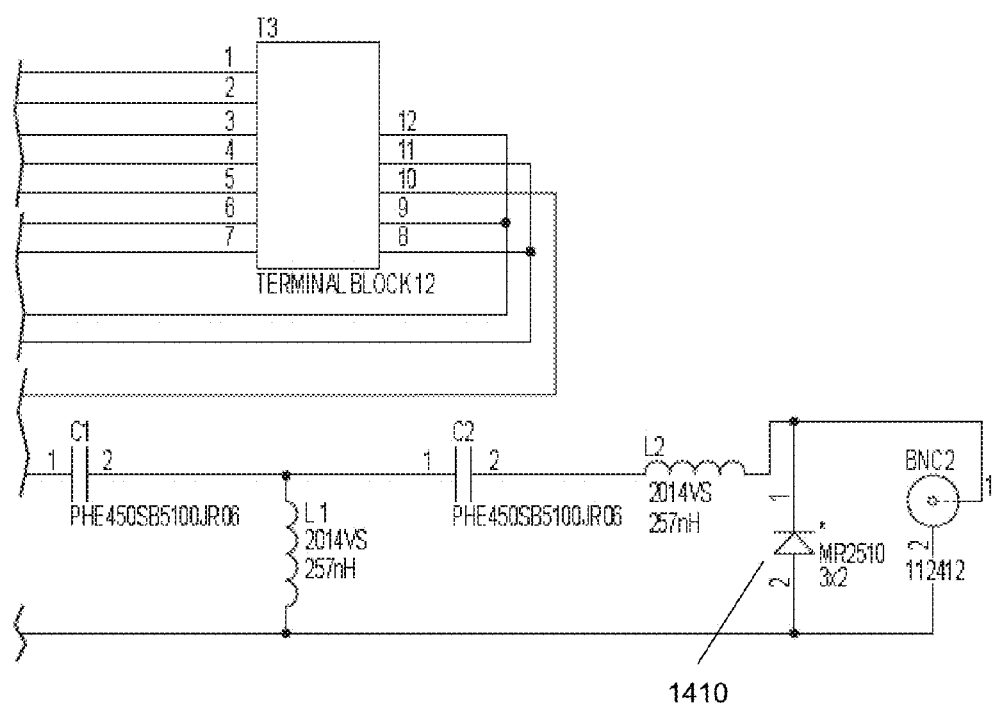
Figure 14E:
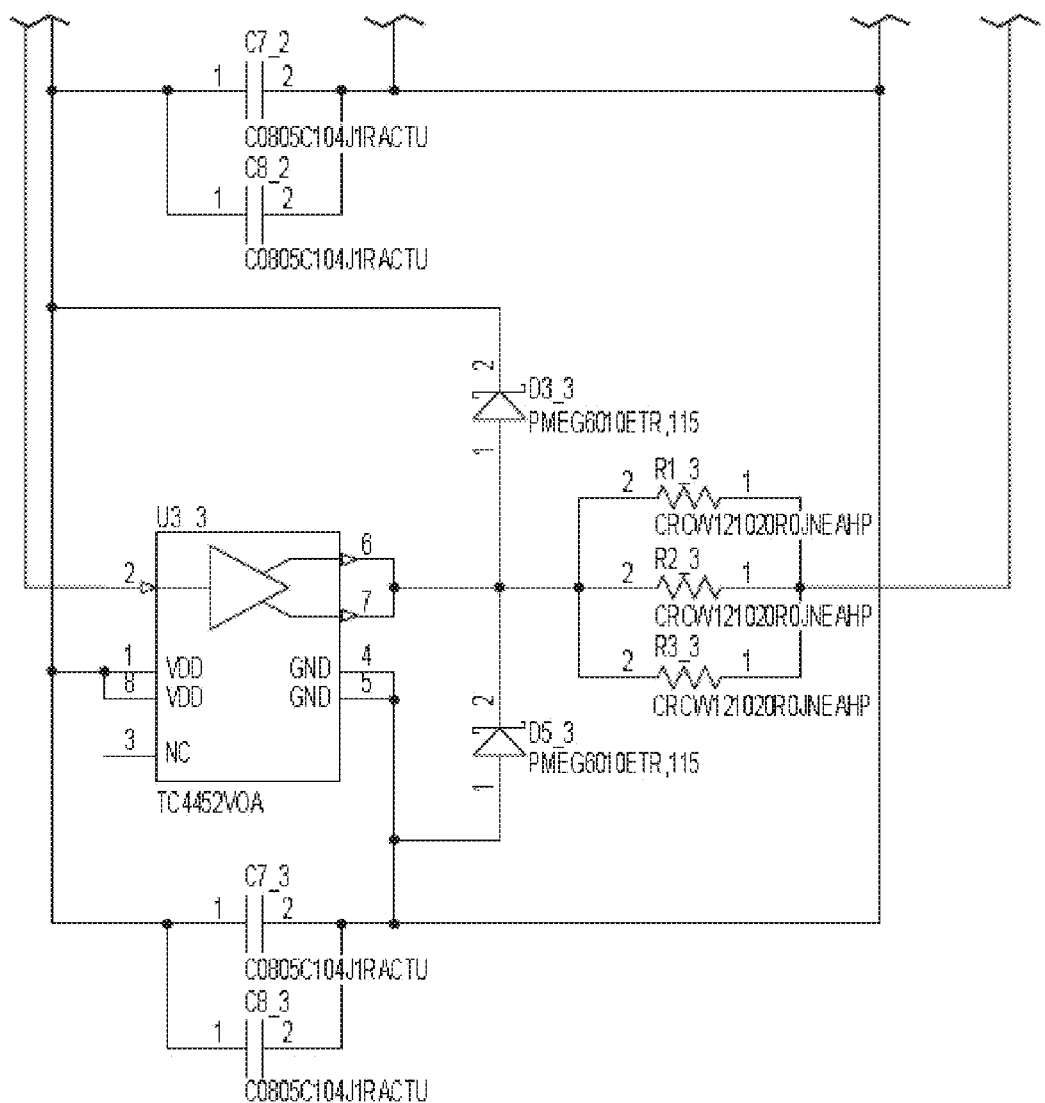

In FIG. 14D the pins of terminal block 12 are connected to 4 MOSFETs of part number C2M0080120D. Pins 1, 4, 7, and 10 of terminal block T3 are connected to the gates of the MOSFETs, pins 2, 5, 8, and 11 are connected to the drains of the MOSFETs, and pins 3, 6, 9, and 12 are connected to the sources of the MOSFETs. In FIG. 14A, pins 1 and 2 of terminal block T1 are connected to a power supply (e.g., Vin of 5 V and ground) for powering support circuitry, which may be isolated from the power circuitry.

In FIG. 14B, pins 1 and 2 of terminal block T2 are connected to an input power supply (e.g., a high voltage power supply) used to charge the resonant circuit to provide the voltage pulse. A charging resistor (now shown) may be connected with the input power supply for charging capacitors. This input power supply (not shown) may or may not be considered part of a power supply circuit. This power supply may be high voltage, e.g., about 0 to 600 V. In FIG. 14A, BNC1 is connected to a controller for controlling a state of the MOSFETS, e.g., a trigger signal. The MOSFETs can correspond to switching mechanism 1220 or be part of switching mechanism 1220. In FIG. 14D, BNC2 is connected to the input conductor.

In FIG. 14D, circuit 1400 comprises a junction recovery diode 1410, one or more switches (e.g., MOSFETs), a first resonant circuit (capacitor C1 and inductor L1 of FIG. 14D), and a second resonant circuit (capacitor C2 and inductor L2). Diode 1410 may be configured to store charges in its depletion layer when there is a forward flow of a current and to rapidly switch open after the depletion layer is discharged by a reverse flow of a current. After diode 1410 rapidly switches opens, the circuit 1400 may provide a reverse current to the input conductor (not shown, but connected to BNC2). The resonant circuits may be considered part of a power supply circuit for providing a DC voltage.

In some embodiments, steps of operations are driven by switches (e.g., MOSFETs) for use with the two resonant circuits. A capacitor (e.g., C1) may be charged in the resonant setup, e.g., using a resistor, such as a 5,000 ohm resistor. Then, all the switches are closed. In other embodiments, there can be as many switches as desired. Closing the switches allows the current to flow from that capacitor. In some implementations, current as high as 120 A can flow in the resonant circuits, and thus the switches can be required to handle such high current.

When that current flows in the resonant network, it produces a current that goes through diode 1410 in a forward direction, e.g., for upwards of 100 nanoseconds. Then, in approximately 50 nanoseconds, the resonant network (2 LC circuits) push current in the negative direction for about 50 nanoseconds. Diode 1410 has a reverse recovery time of about 50-75 nanoseconds, therefore diode 1410 cannot stop the reverse current flowing through it for that amount of time. When diode 1410 finally does stop the reverse current flowing through itself (i.e., when the plasma and the junctions in the diode stop), the voltage pulse stops. This is called the snap-off time in the step-recovery diode.

When diode 1410 snaps off (i.e., when it shuts off the current), inductor L2 is at approximately maximum current flow. Thus, there is maximum current in an inductor and a very fast-switching semiconductor, which is diode 1410, shutting off. The faster the diode 1410 can shut off, the higher the amplitude of the pulse that is provided a resistive load that is in parallel with the diode.

For each pulse, C1 can be charged back up. The time of charging C1 can limit the pulse rate. The time of charging can be varied by selecting a resistor to provide the desired RC constant.

Additional description of nanosecond pulse generators can be found in U.S. Pat. No. 8,120,207, which is incorporated by reference for all purposes. Various diodes can be used, such as step recovery diode (e.g., drift-step recovery diode), silicon opening switch, junction-recovery diode, or any semiconductor junction of a particular type. U.S. Pat. No. 8,120,207 is directed to providing pulses to human biological cells (the load), and not a conductor. The purpose of the short pulses are not to charge the outer cell membrane. There is no contemplation of inducing a voltage in a separate circuit that is not electrically connected to the load (cell). Further, the input voltage is the charge on the capacitor and the output voltage is the voltage applied to the load. Thus, the output voltage corresponds to the input voltage described herein, as the '207 patent never contemplates inducing any voltage in an output circuit.

B. Pulses

Figure 15:
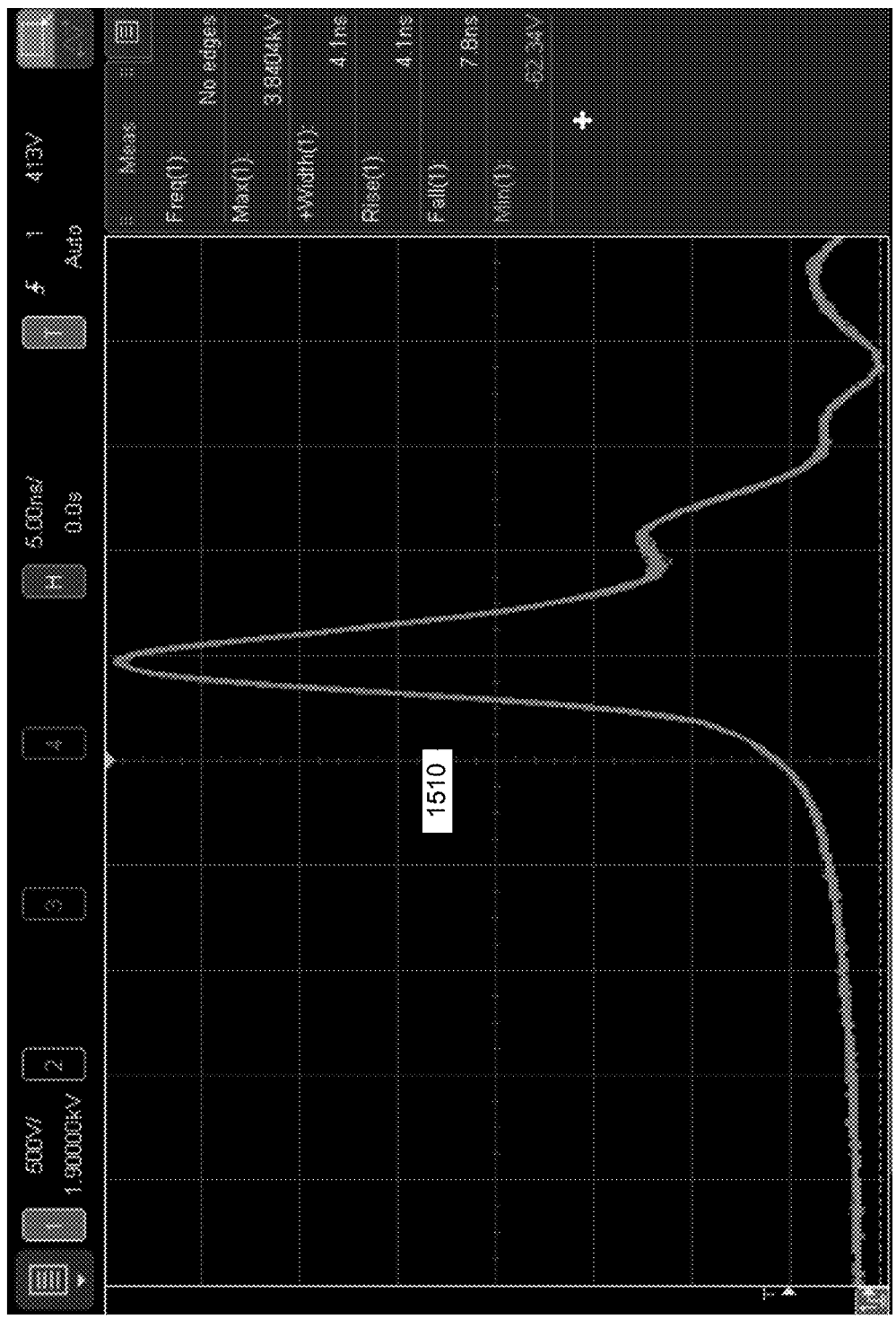
FIG. 15 shows an oscilloscope screenshot 1500 of an input voltage pulse 1510 according to embodiments of the present invention.

FIG. 15 shows an oscilloscope screenshot 1500 of an input voltage pulse 1510 according to embodiments of the present invention. Screenshot 1500 is taken from an oscilloscope by Keysight Technologies, DSOX4104A. Pulse 1510 has a Gaussian-like shape. As shown, the maximum voltage is 3.8404 kV. The width is 4.1 ns. The rise time is 4.1 ns, which is the time from 10% of 3.8404 kV to 90% of 3.8404 kV, in this example. The fall time is 7.8 ns The minimum voltage is −62.34 V, which shows that a pulse can have some negative value for a portion of time. The width measurement it the full-width/half-maximum measurement. The output pulse (and series of output voltage pulses) induced in the output coil is of similar shape as the pulse on the input coil.

The pulse was measured using probes (part. No. 10076C of Keysight Technologies) hooked to an oscilloscope. The passive probes are connected to a gigahertz scope capable of measuring a current load of about 10 A, and upwards to 30 A. The pulse waveform is over a 75 Ohm load in parallel with the input conductor (an input coil in this case). In one implementation, the pulse is sent through a 10-meter coax line having the 75 Ohm load at the end.

X. Example Results

Figure 16A:
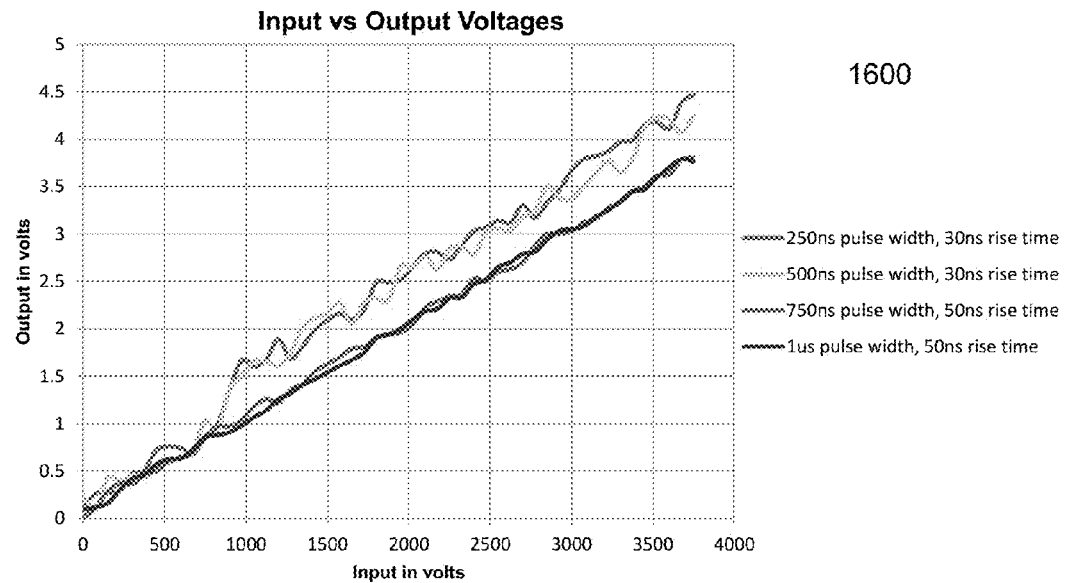
FIGS. 16A and 16B show plots of the amplitude of an input voltage pulse on an input conductor vs. the amplitude of an output voltage pulse induced in an output circuit for various pulse widths and rise times according to embodiments of the present invention.
Figure 16B:
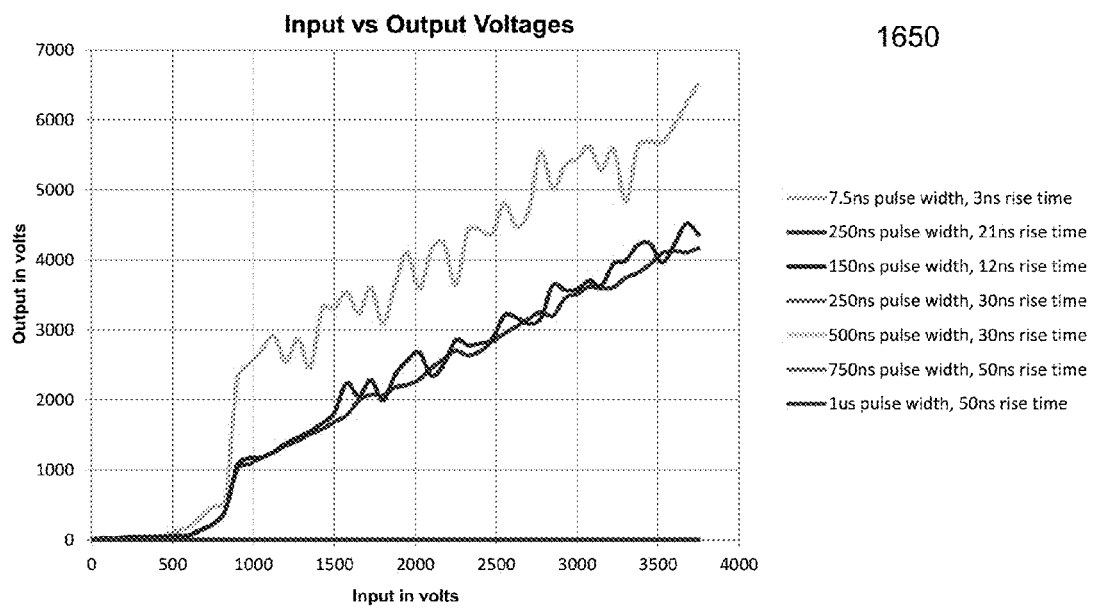

FIGS. 16A and 16B show plots of the amplitude of an input voltage pulse on an input conductor vs. the amplitude of an output voltage pulse induced in an output circuit for various pulse widths and rise times according to embodiments of the present invention. The voltages are the maximum voltage (amplitude) of the pulses. The input voltage pulses have widths that range from 1 μs to 7.5 ns, and the rise times range from 50 ns to 3 ns. FIGS. 16A and 16B show plots in different scales. A pulse rate of 1 kHz was used.

The plots are obtained for an input solenoid coil that has an axis that is perpendicular to an axis of an output solenoid coil (e.g., two cylindrical solenoids that are perpendicular to each other). Thus, for normal operation, a current in the input coil would not induce an appreciable current in the output coil since they are perpendicular to each other. In this geometrical configuration, there is no back coupling between the two coils that will oppose operation of a coil, thus no Lenz effect from one coil to another. Further, in terms of the self-induction (Lenz effect), the pulses are short enough that the amount of current along the input coil does not become large enough to have an appreciable Lenz effect.

FIG. 16A shows a plot 1600 of input vs. output voltages for rise times of 30 ns and 50 ns. As one can see, the output voltage is very small for these rise times. The input voltage is not inducing any voltage because of the geometry that the two coils are configured. There is some induction due to minor capacitive effects.

FIG. 16B shows a plot 1650 of input vs. output voltages for rise times from 50 ns to 3 ns. Only the output voltages for rise times of 21 ns, 12 ns, and 3 ns are visible since the output voltages for rise times 50 ns and 30 ns are so small. It is a surprising result that the output voltage becomes appreciable for less than 30 ns. Thus, when operating with pulses of less than 30 ns, one can induce an appreciable voltage that can be used for charging or communications in the output coil. And, due to the short pulses and coil geometry, the Lenz effect is reduced, while still allowing induction to occur. The jagged behavior in the curves is just due to noise, as the measurements can be sensitive to the environment.

FIG. 17 shows a table 1700 of the data points used to create plots 1600 and 1650 according to embodiments of the present invention. As one can see, the output voltage jumps from rise times of 30 ns to rise time of 21 ns, even when the pulse width stays the same (e.g., at 250 ns width). The jump in induced output voltage for rise times less than 30 ns occurs even with an input voltage of 1 V. There are also jumps when varying voltage for a given rise time, e.g., between 600 V and 675 V and between 825 V and 900 V.

The pulse width does not appreciably affect the induced voltage in the output circuit, at least not compared to the rise time. The pulse width can remain small so that power is not wasted by generating appreciable current in the input circuit, e.g., since that current is not being used to generate the output voltage due to the coil geometry. The output voltage is shown to increase for a smaller rise time. A smaller rise time creates a higher dI/dt as there is a higher dV/dt, which causes a higher $$\frac{\partial \vec{A}}{\partial t}.$$

Further, with smaller rise times and pulse widths, the lower the ultimate power used for the input voltages, because if the input pulse gets to the top quicker then the pulses can be dropped sooner.

As an appreciable output voltage is seen, the effects can be attributed to the longitudinal magnetic vector A, since induction would not normally happen, given the coil geometries. It appears that if the rise in voltage lasts for too long (e.g., 30 ns or more), then the induced voltage is low. The cause may be that current begins to flow and self-induction effects negate the MVPA effects.

As to inducing output pulses in the output circuit with such short input pulses, the pulse rate can increase depending on the charging and power needs, e.g., depending on rise times and induced output voltages. For communications, the faster rise times can provide for communications at longer distances due to the higher electric field.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

A recitation of "a", "an" or "the" is intended to mean "one or more" unless specifically indicated to the contrary.

All Patent, patent applications, publications, and descriptions mentioned here are incorporated by reference in their entirety for all purposes. None is admitted to be prior art.

What is claimed is:

1. An apparatus comprising:
    a power supply circuit for providing a direct current (DC) voltage, wherein the power supply circuit comprises at least one resonant circuit and a diode, wherein a first resonant circuit includes a first capacitor and a first inductor;
    an input conductor selectably connected to the power supply circuit, wherein the input conductor is situated for inducement of an output voltage in an output circuit;
    a switching mechanism coupled with the power supply circuit and the input conductor and configured to connect and disconnect the input conductor to the power supply circuit, thereby causing the diode to store charges in a depletion layer when a forward current exists and to rapidly switch open after the depletion layer is discharged by a reverse current such that an input voltage pulse of the reverse current is provided to the input conductor for inducing an output voltage pulse in the output circuit;
    a controller on a separate ground from the power supply circuit and communicably coupled with the switching mechanism for controlling a connection state of the switching mechanism, wherein the controller is configured to control the switching mechanism, such that the power supply circuit provides a series of input voltage pulses to the input conductor for inducing a series of output voltage pulses in the output circuit, each input voltage pulse having a rise time of less than 30 nanoseconds and having an amplitude of at least 1 volt.

2. The apparatus of claim 1, wherein each input voltage pulse has a rise time of 3 nanoseconds or less.

3. The apparatus of claim 1, wherein each input voltage pulse has an amplitude of at least 50 volts.

4. The apparatus of claim 3, wherein each input voltage pulse has an amplitude of at least 900 volts.

5. The apparatus of claim 1, wherein each input voltage pulse has a pulse width of 100 microseconds or less.

6. The apparatus of claim 5, wherein each input voltage pulse has a pulse width of 1 microsecond or less.

7. The apparatus of claim 1, wherein the first capacitor is configured to be charged by an external power supply when the switching mechanism is open, and wherein the first capacitor is configured to provide the forward current.

8. The apparatus of claim 1, wherein each input voltage pulse has a slew rate of more than 10 V volts per nanosecond.

9. The apparatus of claim 1, wherein the series of input voltage pulses create a time-varying magnetic vector potential perpendicular to a surface of the input conductor.

10. The apparatus of claim 9, wherein the time-varying magnetic vector potential forms a longitudinal wave.

11. The apparatus of claim 1, wherein the input conductor comprises a wire, and wherein the wire comprises a coil.

12. The apparatus of claim 11, wherein the input conductor has a length of at least one foot.

13. The apparatus of claim 11, wherein the coil comprises a solenoid.

14. The apparatus of claim 13, wherein the solenoid is a toroidal solenoid.

15. The apparatus of claim 1, wherein the switching mechanism includes a solid-state switch, and wherein the solid-state switch includes at least one of a MOSFET or an IGBT.

16. The apparatus of claim 1, wherein the controller is configured to provide signals to the switching mechanism to control the connection state of the switching mechanism, and wherein the signals are not periodic.

17. The apparatus of claim 7, wherein the diode is a junction recovery diode.

18. The apparatus of claim 7, wherein the first inductor is in parallel with the diode.

19. The apparatus of claim 18, wherein a second resonant circuit includes a second inductor that is in series with the first capacitor of the first resonant circuit.

20. A method of generating a curl-free magnetic vector potential for inducing an output voltage in an output circuit using a power supply circuit selectably connected to an input conductor, the input conductor situated for inducement of the output voltage in the output circuit, the power supply circuit providing a direct current (DC) voltage, wherein the power supply circuit comprises at least one resonant circuit and a diode, wherein a first resonant circuit includes a first capacitor and a first inductor, the method comprising:
    selectably connecting the power supply circuit to the input conductor using a switching mechanism to cause the diode to store charges in a depletion layer when a forward current exists and to rapidly switch open after the depletion layer is discharged by a reverse current such that an input voltage pulse of the revere current is provided to the input conductor, where the switching mechanism is configured to connect and disconnect the input conductor to the power supply circuit;
    providing, with the power supply circuit, a series of input voltage pulses to the input conductor for inducing a series of output voltage pulses in the output circuit, each input voltage pulse having a rise time of less than 30 nanoseconds and having an amplitude of at least 1 volt; and
    using a controller to control a connection state of the switching mechanism such that the series of input voltage pulses each have a rise time of less than 30 nanoseconds and an amplitude of at least 1 volt, the controller being on a separate ground from the power supply circuit.

21. The method of claim 20, wherein the controller provides signals to the switching mechanism to control the connection state of the switching mechanism, and wherein the signals are periodic.

22. The method of claim 20, wherein each input voltage pulse has an amplitude of at least 50 volts.

23. The method of claim 22, wherein each input voltage pulse has an amplitude of at least 900 volts.

24. The method of claim 20, wherein each input voltage pulse has a pulse width of 100 microseconds or less.

25. The method of claim 24, wherein each input voltage pulse has a pulse width of 1 microsecond or less.

26. The method of claim 20, wherein each pulse has a slew rate of more than 10 V volts per nanosecond.

27. The method of claim 20, wherein the series of input voltage pulses create a time-varying magnetic vector potential perpendicular to a surface of the input conductor, wherein the time-varying magnetic vector potential forms a longitudinal wave.

28. The method of claim 27, further comprising: receiving at the output circuit an electric field generated by the time-varying magnetic vector potential, the electric field creating the series of output voltage pulses in the output circuit.

29. The method of claim 20, wherein the input conductor comprises a wire, and wherein the wire comprises a coil.

30. The method of claim 29, wherein the input conductor has a length of at least one foot.

31. The method of claim 29, wherein the wire comprises a solenoid.

32. The method of claim 31, wherein the solenoid is a toroidal solenoid.

* * * * *